United States Patent
Virolle et al.

(10) Patent No.: US 12,508,275 B2
(45) Date of Patent: Dec. 30, 2025

(54) NEOMYCIN BASED COMPOUNDS, AND PHARMACEUTICAL USE THEREOF

(71) Applicants: UNIVERSITÉ COTE D'AZUR, Nice (FR); CENTRE NATIONAL DE LA RECHERCHE SCIENTIFIQUE, Paris (FR); INSTITUT NATIONAL DE LA SANTE ET DE LA RECHERCHE MEDICALE, Paris (FR); CENTRE HOSPITALIER UNIVERSITAIRE DE NICE, Nice (FR)

(72) Inventors: Thierry Virolle, Puget sur Argens (FR); Maria Duca, Nice (FR); Duc Duy Vo, Umea (SE); Laurent Turchi, Cabris (FR); Hervé Chneiweiss, Paris (FR); Marie-Pierre Junier, Paris (FR)

(73) Assignees: UNIVERSITÉ COTE D'AZUR, Nice (FR); CENTRE NATIONAL DE LA RECHERCHE SCIENTIFIQUE, Paris (FR); INSTITUT NATIONAL DE LA SANTE ET DE LA RECHERCHE MEDICALE, Paris (FR); CENTRE HOSPITALIER UNIVERSITAIRE DE NICE, Nice (FR)

( * ) Notice: Subject to any disclaimer, the term of this patent is extended or adjusted under 35 U.S.C. 154(b) by 863 days.

(21) Appl. No.: 17/764,221

(22) PCT Filed: Sep. 30, 2020

(86) PCT No.: PCT/EP2020/077418
§ 371 (c)(1),
(2) Date: Mar. 28, 2022

(87) PCT Pub. No.: WO2021/064052
PCT Pub. Date: Apr. 8, 2021

(65) Prior Publication Data
US 2022/0395523 A1 Dec. 15, 2022

(30) Foreign Application Priority Data
Sep. 30, 2019 (EP) .................................. 19306237

(51) Int. Cl.
*A61K 31/7036* (2006.01)
*A61P 35/00* (2006.01)

(52) U.S. Cl.
CPC .......... *A61K 31/7036* (2013.01); *A61P 35/00* (2018.01)

(58) Field of Classification Search
CPC .... A61K 31/7036; C07H 15/232; A61P 35/00
See application file for complete search history.

(56) References Cited

PUBLICATIONS

Oxford English Dictionary definition of "geometrical isomer"; accessed Mar. 3, 2025. (Year: 2025).*
Croce, C. M. "Oncogenes and Cancer" 2008, New England Journal of Medicine, vol. 358, pp. 502-511. (Year: 2008).*
Angelbello, A. J.; Disney, M. D. "Bleomycin Can Cleave an Oncogenic Noncoding RNA" 2018, ChemBioChem, vol. 19, pp. 43-47. (Year: 2018).*
Vo, D. D. et al. "Targeting the Production of Oncogenic MicroRNAs with Multimodal Synthetic Small Molecules" *ACS Chem. Biol.,* Dec. 23, 2013, pp. 711-721, vol. 9, No. 3.
Vo, D. D. et al. "Oncogenic MicroRNAs Biogenesis as a Drug Target: Structure-Activity Relationship Studies on New Aminoglycoside Conjugates" *Chem. Eur. J.,* 2016, pp. 5350-5362, vol. 22, No. 15.
Yu, Z. et al. "Targeted Delivery of Bleomycin: A Comprehensive Anticancer Review" *Current Cancer Drug Targets,* 2016, pp. 509-521, vol. 16, No. 6.
Written Opinion in International Application No. PCT/EP2020/077418, Nov. 18, 2020, pp. 1-9.

* cited by examiner

*Primary Examiner* — Eric Olson
*Assistant Examiner* — Benjamin M Brandsen
(74) *Attorney, Agent, or Firm* — SALIWANCHIK, LLOYD & EISENSCHENK

(57) ABSTRACT

The present invention relates to the field of medicine, in particular of oncology. Especially, it provides new compounds useful in the treatment of various cancers, such as glioblastoma, colorectal or breast cancers. The present disclosure also relates to pharmaceutical compositions containing the disclosed compounds.

15 Claims, 6 Drawing Sheets

NEOMYCIN BASED COMPOUNDS, AND PHARMACEUTICAL USE THEREOF

CROSS-REFERENCE TO RELATED APPLICATION

This application is the U.S. national stage application of International Patent Application No. PCT/EP2020/077418, filed Sep. 30, 2020.

FIELD OF THE INVENTION

The present invention relates to the field of medicine, in particular of oncology. Especially, it provides new compounds useful in the treatment of various cancers, such as glioblastoma, colorectal or breast cancers. The present disclosure also relates to pharmaceutical compositions containing the disclosed compounds.

BACKGROUND OF THE INVENTION

Infiltrative gliomas are the most frequent and most severe primary brain tumors. The incidence of gliomas has increased over the past 20 years and is now reaching 5/100 000. The classification of these tumors remains difficult. The WHO classification provides a tumor grading (from I to IV) correlated with the aggressiveness of the tumor. The most severe glioma, which is also the most common, is glioblastoma (GBM) (WHO grade IV) with a median of overall survival not exceeding 15 months. These tumors exhibit massive cell infiltration in the brain parenchyma and are highly vascularized. The standard first-line treatment is currently based on a maximum surgical resection, when the tumor is accessible, followed by a concomitant radio-chemoradiotherapy (60 Gray in 30 fractions, Temozolomide 75 mg/m²/d for 6 weeks). Despite the improvement in survival observed in this trial, the majority of patients survive less than 2 years from diagnosis, while less than 5% will be alive in 5 years, experiencing significant deterioration in their quality of life and multiple debilitating symptoms.

Therefore, there is a need for more effective treatment of glioma or glioblastoma and for the introduction of new agents in clinical trials.

GBM follow the cancer stem cell (CSC) model. This concept proposes that a minority of cells within the tumor mass, with long-term self-renewal and differentiation properties, is not only responsible for the initiation and the growth of tumors but also for intra-tumor heterogeneity. CSCs contribute to all the subtypes of cells that compose the tumor, including endothelial cells. Their functional properties are associated with a molecular signature combining markers of neural and/or embryonic stem cells, and markers of mesenchymal cells. A growing body of evidences supports that these self-renewing tumor cells determine tumor's behavior, including proliferation, progression, invasion, and—most importantly—a great part of resistance to therapies. It is becoming therefore evident that failure of current treatments to eliminate glioma-initiating cells (GICs) contributes to tumor recurrence. Moreover, GICs are not restricted to adult GBM but can also be isolated from pediatric glioma of dismal outcome, such as deep infiltrating pontine glioma. Targeting GICs and their stem-like properties constitutes thus one of the main therapeutic challenges to significantly improve anti-cancer treatments. A relevant solution to target GICs is to force them to exit their stemness program and to adopt a more differentiated phenotype. Under this non-stem-like state, the cells lose their tumorigenicity and become vulnerable to therapies. In that context, it was demonstrated that the miR-302-367 cluster is able to efficiently trigger a cascade of inhibitory events leading to the disruption of GiCs stem-like and tumorigenic properties. In other micro-RNA profiling studies to search for regulators of stem cell plasticity, miR-18a* was identified as a potential candidate whose expression was correlated with the stemness state. Forcing miR-18a* expression in GiCs was found to increase clonal proliferation in vitro and tumorigenicity in vivo.

The inventors propose to develop compounds to repress stemness features of cancer stem cells such as stemness markers and self-renewal, to decrease their growth while increasing their sensitivity to an anti-cancer treatment such as chemotherapy or radiotherapy. In the context of oncogenic and tumor-suppressive miRNAs, the inventors developed neomycin-based compounds which have the ability to reproduce the miR-302-367 cluster inhibitory effects on stemness properties (i.e. loss of self-renewal, proliferation and stemness markers).

The compounds developed and described here have been designed based on the conjugation of two different RNA binding domains: (i) aminoglycoside neomycin and (ii) anticancer agent bleomycin's side chains. Concerning the first domain, neomycin is a well-known and general RNA ligand able to bind to various structured RNAs mainly upon formation of non-specific interactions (electrostatic interactions). The second domain is represented by side chains of a group of natural compounds widely employed in cancer chemotherapy and called bleomycins. These compounds act by various mechanisms of action whose main one is the inhibition of topoisomerase II action on DNA. The side chains of bleomycins are variable domains recognized to be responsible for the specific interaction of these compounds with the DNA targets.

It has been found surprisingly that said compounds can reproduce the biological effects of miR302-367 cluster, which render said compounds appropriate for the treatment of cancers.

Said compounds are potent inhibitors of GiCs stem-like and tumorigenic properties and therefore of Temozolomide resistance.

SUMMARY OF THE INVENTION

Accordingly, the present invention relates to a compound with the following formula (I):

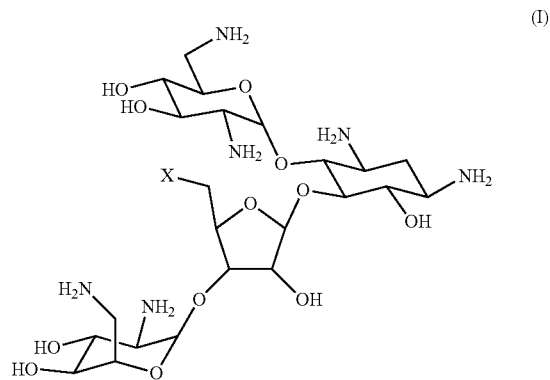

wherein X is selected in the group consisting of:

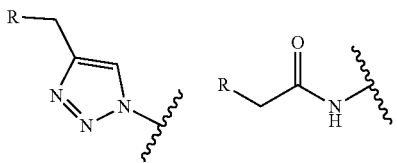

where R is represented below:

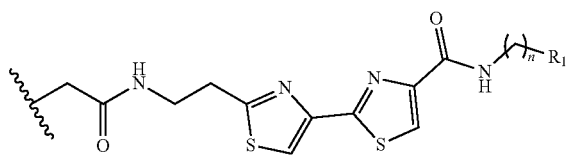

with n being an integer from 1 to 6, preferably 2, 3, and 4;

$R_1$ being a —$NHR_2$, —$NR_3R_4$, or a guanidyl group;

$R_2$ is a hydrogen atom, an amine protecting group, or an aminoalkyl group;

$R_3$ and $R_4$, identical or different, are independently a hydrogen atom, an amine protecting group, or an aminoalkyl group;

where any amine group being optionally protected by an amine protecting group;

or a salt, stereoisomer (diastereoisomer, enantiomer), a racemic mixture, geometric isomers, or a mixture thereof.

The present disclosure also relates to pharmaceutical compositions containing the disclosed compounds and to their use as a medicine, in particular for the treatment of cancers, such as glioma, glioblastoma, colorectal or breast cancer.

BRIEF DESCRIPTION OF THE DRAWINGS

FIG. 3: Nude mice were orthotopically xenografted by luminescent patient derived GSC. (A-B) Two weeks following injections, mice were intraperitoneally injected with 10 mg/kg (n=4), 7.5 mg/kg (n=4) or 5 mg/kg (n=4) of Compound 9a or vehicle alone as control (ctl n=10). A) graphical representation of the average of tumor growth in the control group (n=10) and in each Compound 9a treated groups. B) Survival of the whole population of mice of the untreated and treated groups were compared using a log rank test according to Kaplan Meier method. (R command, see World Wide Web: biostatgv.sentiweb.fr/?module=tests/surv). The solid line represents the survival rate of control untreated mice. The dotted line represents the survival rate of mice treated by compound 9a. C) Mice treatment with compound 9a when the tumors were already formed. Tumor growth representation in mice, treated either with DMSO (control: -♦-) or Compound 9a (-■-). Tumor growth was controlled every week by live imaging. The solid line represents the tumor growth in control untreated mice. The dotted line represents the tumor growth in mice treated by compound 9a.

DETAILED DESCRIPTION

Figure 1:
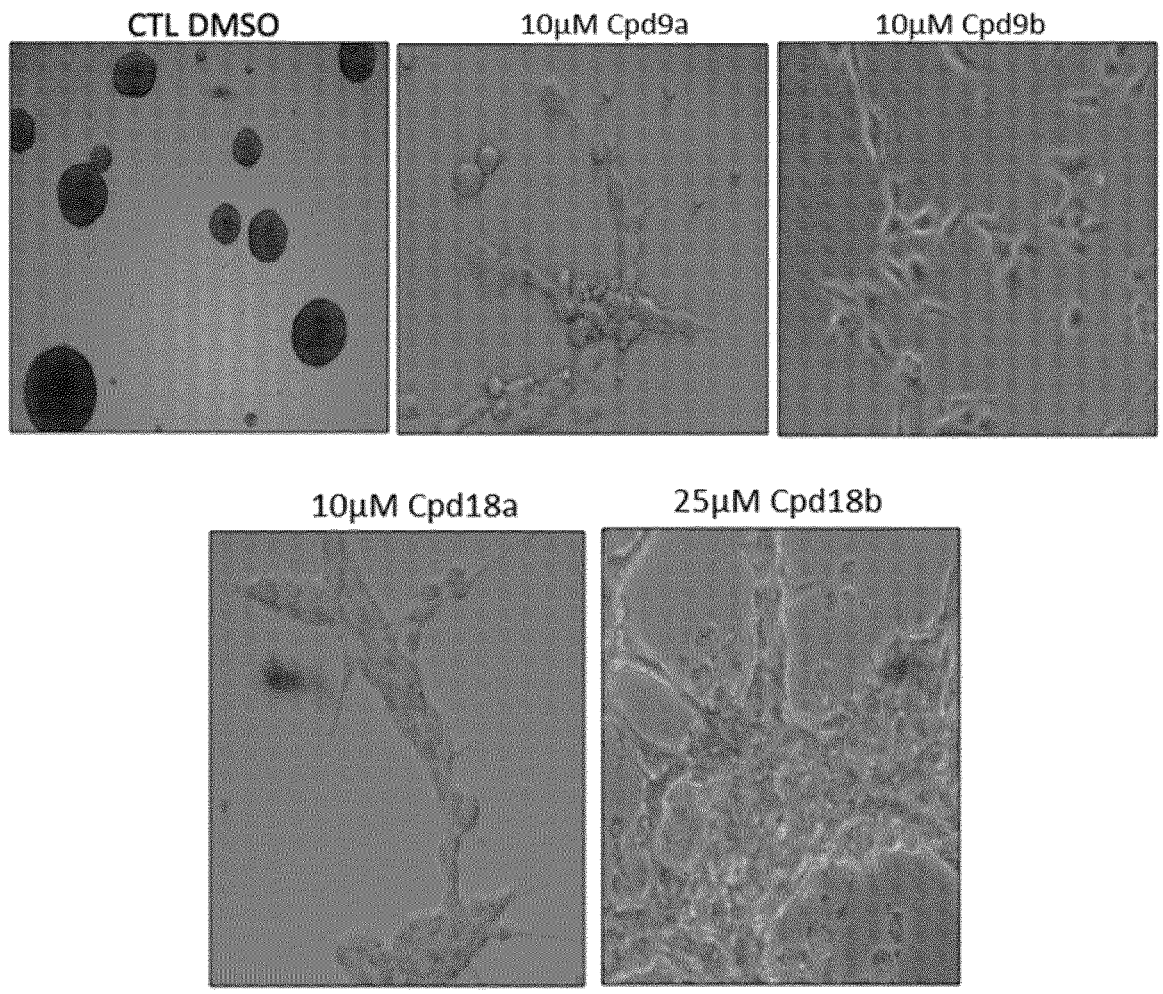
FIG. 1: phase contrast images of GB5 morphology untreated (CTL DMSO) or treated with the indicated compound ("Cpd" denotes compound) at the indicated concentration. Control cells grow as non-adherent spheroids composed of numerous GSC. When differentiated the cells become adherent and spread on the culture dish.

Accordingly, and in a first aspect of the invention, it is herein disclosed a compound of general formula (I):

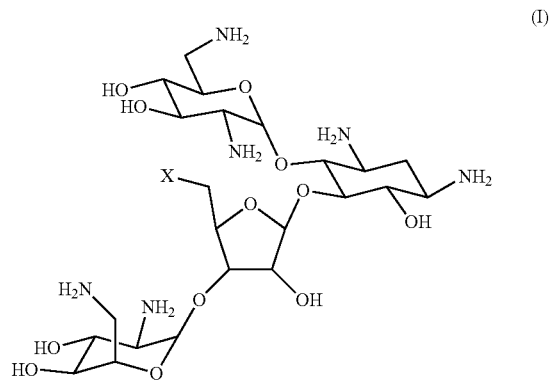

wherein X is selected in the group consisting of:

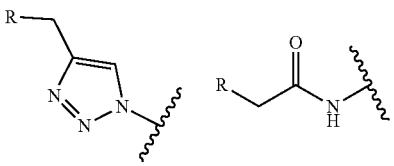

and wherein R is represented below:

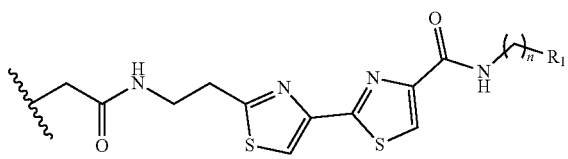

with n being an integer from 1 to 6, preferably 2, 3, and 4;

and $R_1$ being a —$NHR_2$, —$NR_3R_4$, or a guanidyl group;

$R_2$ is a hydrogen atom, an amine protecting group, or an aminoalkyl group;

$R_3$ and $R_4$, identical or different, are independently a hydrogen atom, an amine protecting group, or an aminoalkyl group;

where any amine group being optionally protected by any amine protecting group;

or a salt, stereoisomer (diastereoisomer and/or enantiomer), a racemic mixture, geometric isomers, or a mixture thereof.

According to the invention, any compound of formula (I) can be positively charged, for instance under neutral (physiological) and acid conditions. For instance, any nitrogen atom can be an ammonium ion ($N^+$), including any nitrogen atom of $R_1$.

According to the invention, the term "($C_1$-$C_{10}$)alkyl" designates a saturated hydrocarbonated group, straight or branched, having from 1 to 10, preferably from 1 to 6, carbon atoms. Examples of straight chain alkyl groups include, but are not limited to, those with from 1 to 10 carbon atoms such as methyl, ethyl, n-propyl, n-butyl, n-pentyl, n-hexyl groups, n-heptyl, n-octyl, n-nonyl and n-decyl groups. Examples of branched alkyl groups include, but are not limited to, isopropyl, iso-butyl, sec-butyl, tert-butyl, isopentyl, and 2,2-dimethylpropyl groups.

Alkyl groups may be unsubstituted or substituted by an amino group (—$NH_2$) or a protected amino group.

According to the invention, the term "aminoalkyl" designates a ($C_1$-$C_{10}$)alkyl group as defined above which is terminated by an amine group, said amine group being optionally protected by an amine protecting group. More preferably, the aminoalkyl group is represented by the formula: —$(CH_2)_m NH_2$, where m is an integer from 1 to 10, preferably from 1 to 6, more preferably 4.

An amine protecting group is well known in the art. For instance, an amine protecting group forms, with the amino group to which it is attached, one of the following protected amino groups: 9-Fluorenylmethyl carbamate (FMOC), t-Butyl carbamate (Boc), benzyl carbamate (Cbz), acetamide, trifluoroacetamide, phtalimide, benzylamide, triphenylmethylamine (Tr), benzylideneamine, or p-toluenesulfonamine (Ts). Preferably, the protected amino group is t-Butyl carbamate or acetamide. Deprotection of protected amino groups is well known in the art. For instance, deprotection of Boc group can be carried out in the presence of trifluoroacetic acid (TFA) in $CH_2Cl_2$.

According to a particular embodiment, the compound of the invention is of formula (I) wherein X is

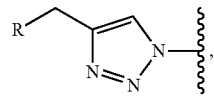

wherein R is as defined above, more preferably wherein n is 3 or 4, and $R_1$ is a guanidyl group, or $R_1$ is —$NR_3R_4$, with $R_3$ being an hydrogen atom or an amine protecting group, and $R_4$ being an aminoalkyl group;

where any one of amine groups being optionally protected by any amine protecting group; or a salt, stereoisomer (diastereoisomer and/or enantiomer), a racemic mixture, geometric isomers, or a mixture thereof.

According to another particular embodiment, the compound of the invention is of formula (I) wherein X is

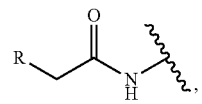

wherein R is as defined above, more preferably wherein n is 3 or 4, and $R_1$ is —$NH_2$, or $R_1$ is —$NR_3R_4$, with $R_3$ being an hydrogen atom or an amine protecting group, and $R_4$ being an aminoalkyl group;

where any one of amine groups being optionally protected by any amine protecting group;

or a salt, stereoisomer (diastereoisomer and/or enantiomer), a racemic mixture, geometric isomers, or a mixture thereof.

According to a particular embodiment, the compound of the invention is of formula (I) where $R_1$ is a —$NHR_2$, —$NR_3R_4$, or a guanidyl group;

where $R_2$ is a hydrogen atom, an amine protecting group, or —$(CH_2)_m NH_2$, where m is an integer from 1 to 6; $R_3$ and $R_4$, identical or different, are independently a hydrogen atom, an amine protecting group, or —$(CH_2)_m NH_2$, where m is an integer from 1 to 6, where any amine group being optionally protected by an amine protecting group.

According to a particular embodiment, m is 2, 3, 4, 5, or 6, and more preferably m is 4.

The compounds discussed herein also encompass their stereoisomers (diastereoisomers, enantiomers), pure or mixed, racemic mixtures, geometrical isomers, tautomers, salts, hydrates, solvates, solid forms as well as their mixtures. Some compounds according to the invention and their salts could be stable in several solid forms. The present invention includes all the solid forms of the compounds according to the invention which includes amorphous, polymorphous, mono- and polycrystalline forms.

The compounds according to the invention can exist in non-solvated or solvated form, for example with pharmaceutically acceptable solvents such as water (hydrates) or ethanol.

More specifically, the present invention relates to a compound of the formula (I) where at least one, or all, of the following definitions are met:

n is 3 or 4;

R₁ is selected in the groups consisting of —NH₂, a guanidyl group, or —NH(CH₂)$_m$NH₂ (where m is as defined above, preferably m is 3 or 4 or 5).

More specifically, the compound of the invention is a compound of formula (I) wherein R is one of the following formulas:

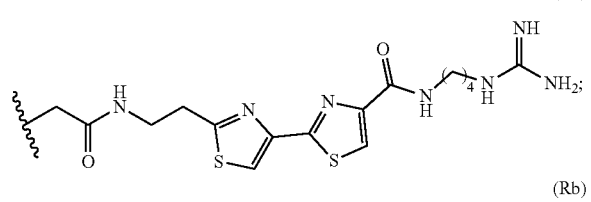

(Ra)

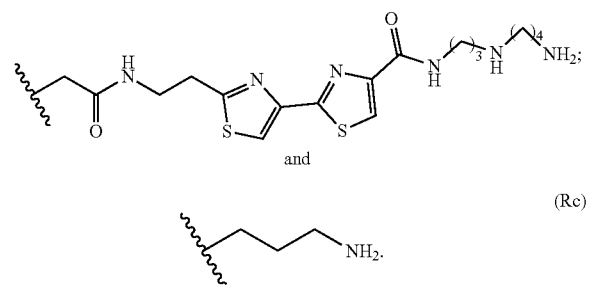

(Rb)

and (Rc)

According to a particular embodiment, the compound is of formula (I) wherein X is

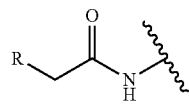

and R is Rb or Rc;
  where any one amine group being optionally protected by any amine protecting group, preferably the Boc group;
  or a salt, stereoisomer (diastereoisomer and/or enantiomer), a racemic mixture, geometric isomers, or a mixture thereof.

According to another particular embodiment, the compound is of formula (I) wherein X is and R is Ra or Rb;
  where any one amine group being optionally protected by any amine protecting group, preferably the Boc group;
  or a salt, stereoisomer (diastereoisomer and/or enantiomer), a racemic mixture, geometric isomers, or a mixture thereof.

According to a specific embodiment, the compound of formula (I) is selected in the group consisting of:

(Compound 9a)

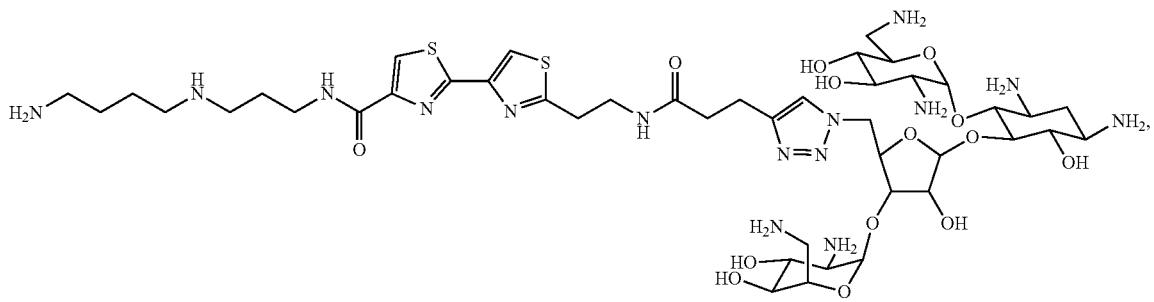

(Compound 9b)

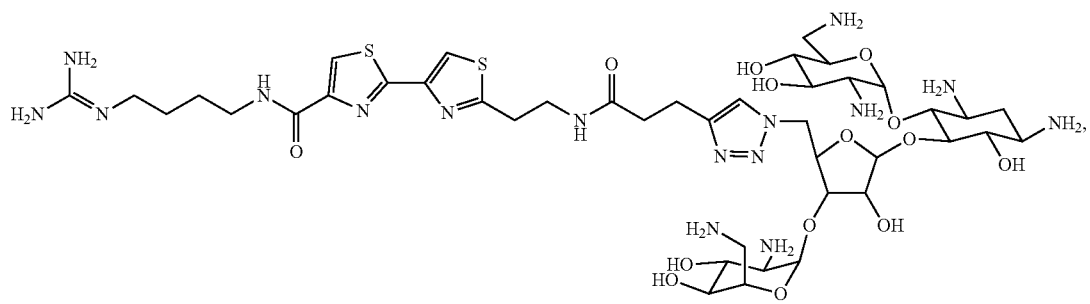

-continued
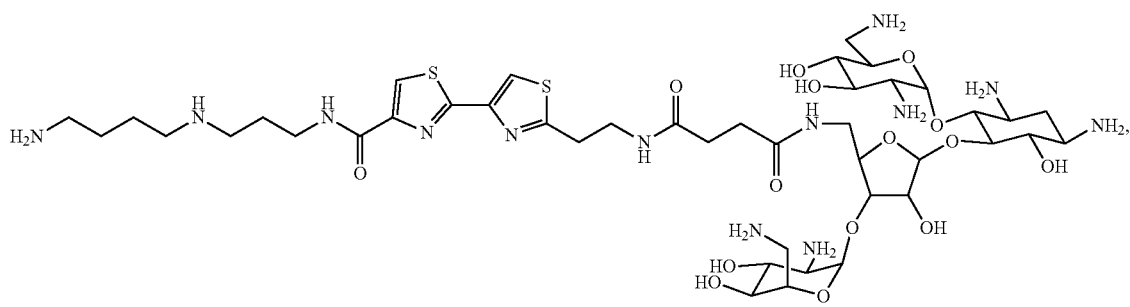
(Compound 18a)
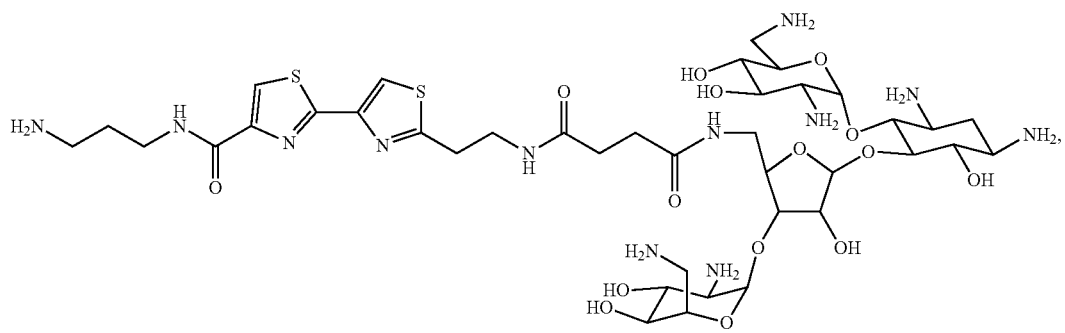
(Compound 18b)
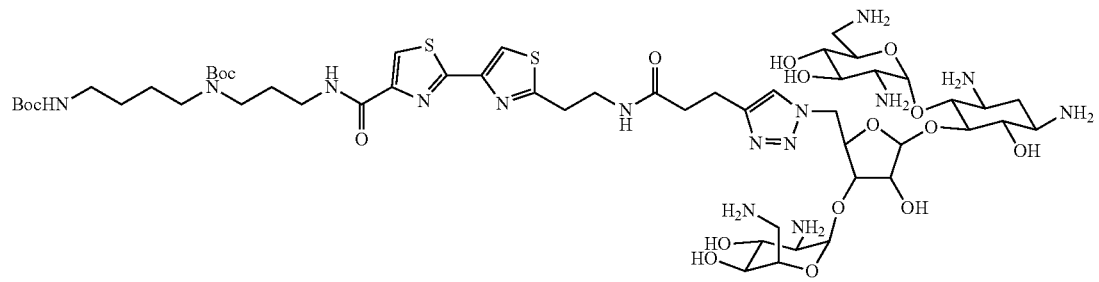
(Compound 8a) (which corresponds to compound 9a with amino-protecting groups), and
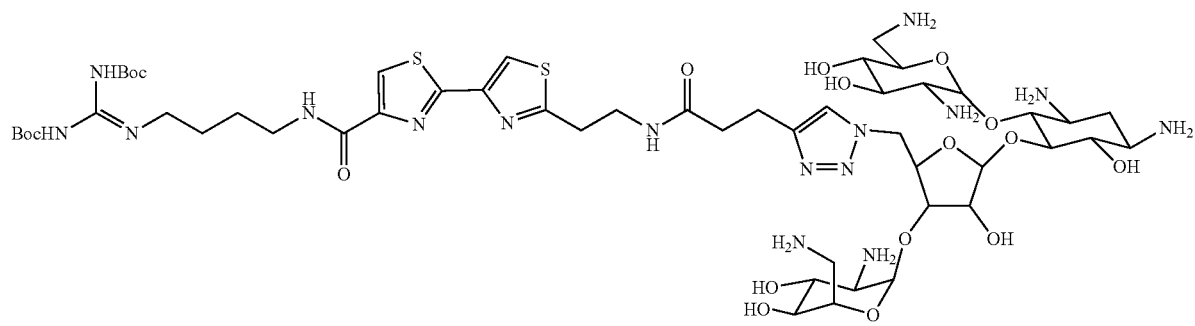 [SMILES: CC(C)(C)OC(=O)NC(=NCCCCNC(=O)c1csc(-c2csc(CCNC(=O)CCc3cn(CC4OC(OC5C(O)C(N)CC(N)C5OC5OC(CN)C(O)C(O)C5N)C(O)C4OC4OC(CN)C(O)C(O)C4N)nn3)n2)n1)NC(=O)OC(C)(C)C]
(Compound 8b) (which corresponds to compound 9b with amino-protecting groups).

According to a more specific embodiment, the compound of formula (I) is selected in the group consisting of:

(Compound 9a)

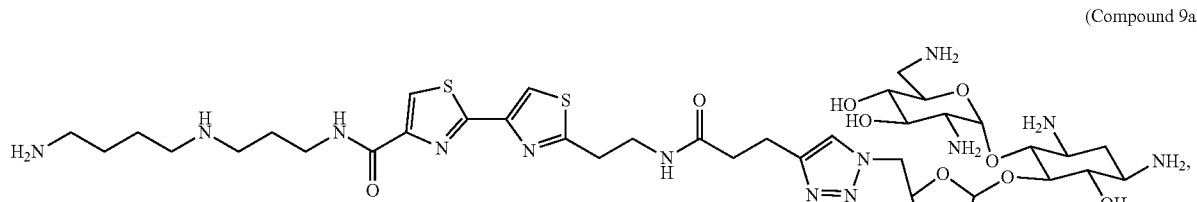
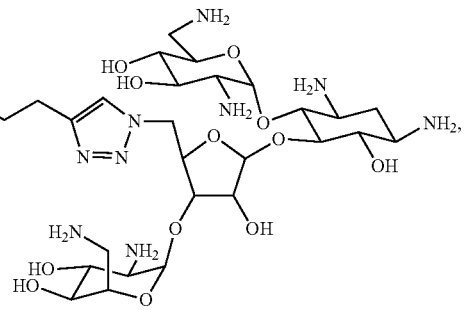

(Compound 9b)

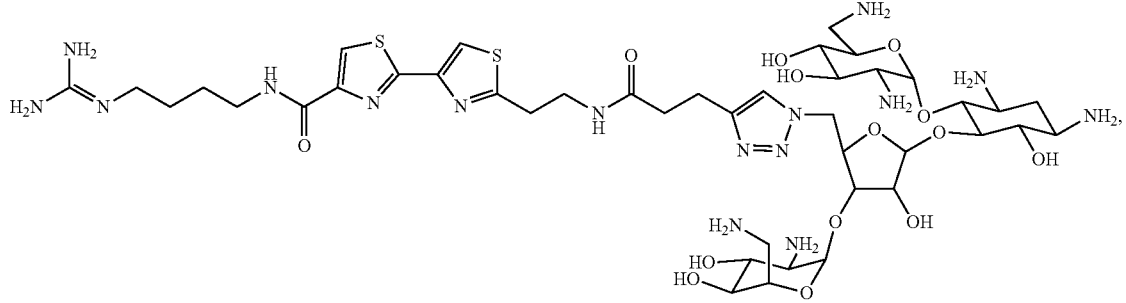

more preferably the compound of formula (I) is compound 9a.

The compounds according to the present invention may be prepared by various methods known to those skilled in the art. The present invention also concerns processes for preparing the compounds of the invention.

The compounds of the invention are based on the conjugation of two different RNA binding domains: (i) aminoglycoside neomycin and (ii) anticancer agent bleomycin's side chains. According to one embodiment, the present invention relates to a process for preparing a compound as defined above where a 1,3-dipolar cycloaddition reaction is carried out leading thereby to a triazole linker arm between the two RNA binding domains: (i) aminoglycoside neomycin and (ii) side chains of bleomycin. This implies the preparation of the two partners for the cycloaddition reaction that are the azido derivative of neomycin and the alkyne derivative of bleomycin A5, B2 and A2 side chains. The preparation of the azido derivative of neomycin Neo-N$_3$ has already been reported in the literature (Vo D. D., Staedel C., Zehnacker L., Benhida R., Darfeuille F., Duca M. Targeting the production of oncogenic microRNAs with multimodal synthetic small molecules *ACS Chem. Biol.* 2014 9, 711-721). The method for preparation of the alkyne derivatives of bleomycin A5, B2 and A2 side chains is described in the examples. The three side chains of bleomycin bear the same bithiazole scaffold whose synthesis is also illustrated in the examples below.

The compounds of the invention have been found to limit the self-renewal of cancer stem cells and decrease the growth of such cells as well as render the tumor cells sensitive to an anti-cancer treatment. The compounds of the invention appear to be able to eliminate or reduce glioma-initiating cells (GICs) or to force them to acquire a non-self-renewing state or to force them to lose their tumorigenicity or to become vulnerable to therapies, such as chemotherapy and/or radiotherapy. Moreover, effective concentrations of the compounds of the invention are non-toxic towards normal cells, such as normal human liver, renal or neural cells.

Compounds of formula (I) can thus be used for therapeutic purposes, in particular for use as a medicine.

The compound of the invention is more particularly for use in the treatment of cancer.

The terms "cancer", "cancerous", or "malignant" refer to or describe the physiological condition in mammals that is typically characterized by unregulated cell growth. Examples of cancer include, for example, leukemia, lymphoma, blastoma, carcinoma and sarcoma. More particular examples of such cancers include chronic myeloid leukemia, acute lymphoblastic leukemia, chronic lymphocytic leukemia, Philadelphia chromosome positive acute lymphoblastic leukemia (Ph+ALL), squamous cell carcinoma, lung cancer, small-cell lung cancer, non-small cell lung cancer, gastrointestinal cancer, renal cancer, ovarian cancer, liver cancer, colorectal cancer, endometrial cancer, kidney cancer, prostate cancer, thyroid cancer, neuroblastoma, osteosarcoma, pancreatic cancer, glioma, glioblastoma multiforme, cervical cancer, stomach cancer, bladder cancer, hepatoma, breast cancer, oesophagal cancer, colon carcinoma, and head and neck cancer, gastric cancer, germ cell tumor, pediatric sarcoma, sinonasal natural killer, multiple myeloma, acute myelogenous leukemia (AML), mastocytosis and any symptom associated with mastocytosis. In a particular embodiment, the cancer is a solid tumor cancer. In another particular embodiment, the cancer is a non-solid tumor cancer. In another particular embodiment, the cancer is an epithelial tumor cancer with cancer stem cells.

The compound of the invention is particularly for use in the treatment of glioma, glioblastoma, or epithelial tumor cancer with cancer stem cells, including colorectal cancer or breast cancer, more preferably for use in the treatment of glioma or glioblastoma, and even more preferably glioblastoma.

Accordingly, it is herein disclosed a method for treating a cancer, which method comprises administering to a subject in need of such treatment an effective amount of at least one of compound or a pharmaceutical comprising the same, as defined in the present invention.

The subject may be a human being or any animal, preferably a human being or a mammal, including cattle, sheep, horses, dogs, cats, goats etc. Preferably the subject is a human patient, whatever his/her age or sex. New-borns, infants, children, adults are included.

As disclosed herein, the term "treatment" or "treating" refers to an improvement, the prophylaxis of a disease or disorder, or at least one symptom can be discerned therefrom. This also means an improvement, prevention of at least one measurable physical parameter associated with the disease or disorder being treated, which is not necessarily discernible in the subject. "treatment" or "treating" further refers to inhibiting or slowing the progression of a disease or disorder, physically, stabilization of a discernible symptom, physiologically, for example, stabilization of a physical parameter, or both. "treatment" or "treating" also refers to delaying the onset of a disease or disorder. In some particular embodiments, compounds of interest are administered as a preventive measure. In this context, "prevention" or "preventing" refers to a reduction in the risk of acquiring a disease or disorder specified.

In the context of a treatment, the compound of the invention may be administered to a subject by any suitable route, including oral, topical, sublingual, parenteral (preferably intravenous), transdermal, rectal, etc. For a brief review of present methods for drug delivery, see, Langer, Science 249:1527-1533 (1990), which is incorporated herein by reference.

The present invention also concerns a pharmaceutical composition comprising a compound of the invention, in particular a compound of formula (I), as described above, and a pharmaceutically acceptable carrier and/or excipient. This particular aspect also concerns the preferred embodiments disclosed above for the compounds of the invention. In a particular embodiment, the pharmaceutical composition comprises a compound according to any of the above embodiments.

"Pharmaceutically" or "pharmaceutically acceptable" refer to molecular entities and compositions that do not produce an adverse, allergic or other untoward reaction when administered to a mammal, especially a human, as appropriate. A pharmaceutically acceptable carrier or excipient refers to a non-toxic solid, semi-solid or liquid filler, diluent, encapsulating material or formulation auxiliary of any type.

The pharmaceutical composition of the invention is formulated in accordance with standard pharmaceutical practice (see, e.g., Remington: The Science and Practice of Pharmacy (20th ed.), ed. A. R. Gennaro, Lippincott Williams & Wilkins, 2000 and Encyclopedia of Pharmaceutical Technology, eds. J. Swarbrick and J. C. Boylan, 1988-1999, Marcel Dekker, New York) known by a person skilled in the art. The excipient of the composition can be any pharmaceutically acceptable excipient, including specific carriers able to target specific cells, cellular compartments or tissues. As stated earlier, possible pharmaceutical compositions include those suitable for oral, rectal, topical, transdermal, buccal, sublingual, or parenteral (including subcutaneous, intramuscular, intravenous and intradermal) administration. For these formulations, conventional excipients can be used according to techniques well known by those skilled in the art. The compositions for parenteral administration are generally physiologically compatible sterile solutions or suspensions which can optionally be prepared immediately before use from solid or lyophilized form. For oral administration, the composition can be formulated into conventional oral dosage forms such as tablets, capsules, powders, granules and liquid preparations such as syrups, elixirs, and concentrated drops. Non-toxic solid carriers or diluents may be used which include, for example, pharmaceutical grades of mannitol, lactose, starch, magnesium stearate, sodium saccharine, talcum, cellulose, glucose, sucrose, magnesium, carbonate, and the like. For compressed tablets, binders, which are agents which impart cohesive qualities to powdered materials, are also necessary. For example, starch, gelatine, sugars such as lactose or dextrose, and natural or synthetic gums can be used as binders. Disintegrants are also necessary in the tablets to facilitate break-up of the tablet. Disintegrants include starches, clays, celluloses, algins, gums and crosslinked polymers. Moreover, lubricants and glidants are also included in the tablets to prevent adhesion to the tablet material to surfaces in the manufacturing process and to improve the flow characteristics of the powder material during manufacture. Colloidal silicon dioxide is most commonly used as a glidant and compounds such as talc or stearic acids are most commonly used as lubricants. For transdermal administration, the composition can be formulated into ointment, cream or gel form and appropriate penetrants or detergents could be used to facilitate permeation, such as dimethyl sulfoxide, dimethyl acetamide and dimethylformamide. For transmucosal administration, nasal sprays, rectal or vaginal suppositories can be used. The active compound can be incorporated into any of the known suppository bases by methods known in the art. Examples of such bases include cocoa butter, polyethylene glycols (carbowaxes), polyethylene sorbitan monostearate, and mixtures of these with other compatible materials to modify the melting point or dissolution rate. In a preferred embodiment, the pharmaceutical composition of the invention is suitable for parenteral administration.

Preferably, the pharmaceutical compositions contain vehicles which are pharmaceutically acceptable for a formulation capable of being injected. These may be in particular isotonic, sterile, saline solutions (monosodium or disodium phosphate, sodium, potassium, calcium or magnesium chloride and the like or mixtures of such salts), or dry, especially freeze-dried compositions which upon addition, depending on the case, of sterilized water or physiological saline, permit the constitution of injectable solutions.

The pharmaceutical forms suitable for injectable use include sterile aqueous solutions or dispersions; formulations including sesame oil, peanut oil or aqueous propylene glycol; and sterile powders for the extemporaneous preparation of sterile injectable solutions or dispersions. In all cases, the form must be sterile and must be fluid to the extent that easy syringability exists. It must be stable under the conditions of manufacture and storage and must be preserved against the contaminating action of microorganisms, such as bacteria and fungi.

Solutions comprising compounds of the invention as free base or pharmacologically acceptable salts can be prepared in water suitably mixed with a surfactant, such as hydroxypropylcellulose. Dispersions can also be prepared in glycerol, liquid polyethylene glycols, and mixtures thereof and in oils. Under ordinary conditions of storage and use, these preparations contain a preservative to prevent the growth of microorganisms. The compound according to the invention can be formulated into a composition in a neutral or salt form. Pharmaceutically acceptable salts include the acid addition salts (formed with the free amino groups of the protein) and which are formed with inorganic acids such as, for example, hydrochloric or phosphoric acids, or such organic acids as acetic, oxalic, tartaric, mandelic acid and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. The carrier can also be a solvent or dispersion medium containing, for example, water, ethanol, polyol (for example, glycerol, propylene glycol, and liquid polyethylene glycol, and the like), suitable mixtures thereof, and vegetables oils. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

Sterile injectable solutions are prepared by incorporating the active polypeptides in the required amount in the appropriate solvent with several of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

Upon formulation, solutions will be administered in a manner compatible with the dosage formulation and in such amount as is therapeutically effective. The formulations are easily administered in a variety of dosage forms, such as the type of injectable solutions described above, but drug release capsules and the like can also be employed.

For parenteral administration in an aqueous solution, for example, the solution should be suitably buffered if necessary and the liquid diluent first rendered isotonic with sufficient saline or glucose. These particular aqueous solutions are especially suitable for intravenous, intramuscular, subcutaneous and intraperitoneal administration. In this connection, sterile aqueous media which can be employed will be known to those of skill in the art in light of the present disclosure.

In a particular embodiment, the pharmaceutical composition according to the invention comprises 0.001 mg to 1 g of the compound of the invention. Preferably, pharmaceutical composition according to the invention comprises 0.01 mg to 800 mg of the compound of the invention.

Pharmaceutical compositions according to the invention can comprise one or more compound of the invention in association with pharmaceutically acceptable excipients and/or carriers. These excipients and/or carriers are chosen according to the form of administration as described above.

The compound according to the invention according to the invention may be combined with pharmaceutically acceptable excipients, and optionally sustained-release matrices, such as biodegradable polymers, to form therapeutic compositions.

Pharmaceutical composition according to the invention may be formulated to release the active drug substantially immediately upon administration or at any predetermined time or a time period after administration.

Typically, the compound according to the invention is typically administered in a therapeutically effective amount.

By a "therapeutically effective amount" is meant a sufficient amount of a compound according to the invention to treat and/or to prevent the disease at a reasonable benefit/risk ratio applicable to any medical treatment.

It will be understood that the total daily usage of the compounds and compositions of the present invention will be decided by the attending physician within the scope of sound medical judgment. The specific therapeutically effective dose level for any particular patient will depend upon a variety of factors including the disease being treated and the severity of the disease; activity of the specific compound employed; the specific composition employed, the age, body weight, general health, sex and diet of the patient; the time of administration, route of administration, and rate of excretion of the specific compound employed; the – duration of the treatment; drugs used in combination or coincidental with the specific compound employed; and like factors well known in the medical arts. For example, it is well known within the skill of the art to start doses of the compound at levels lower than those required to achieve the desired therapeutic effect and to gradually increase the dosage until the desired effect is achieved. However, the daily dosage of the products may be varied over a wide range from 0.01 to 1,000 mg per adult per day. Preferably, the compositions contain 0.01, 0.05, 0.1, 0.5, 1.0, 2.5, 5.0, 10.0, 15.0, 25.0, 50.0, 100, 250 and 500 mg of the active ingredient for the symptomatic adjustment of the dosage to the patient to be treated. A medicament typically contains from about 0.01 mg to about 500 mg of the active ingredient, preferably from 1 mg to about 100 mg of the active ingredient. An effective amount of the drug is ordinarily supplied at a dosage level from 0.0002 mg/kg to about 20 mg/kg of body weight per day, especially from about 0.001 mg/kg to 7 mg/kg of body weight per day.

A further object of the invention relates to pharmaceutical compositions comprising a compound according to the invention for the treatment of cancer, more specifically for the treatment of a cancer as detailed above or more specifically for the treatment of glioma or glioblastoma.

Another object of the invention relates to the use of a compound of the invention and as detailed herein for the preparation of a pharmaceutical composition in the treatment of cancer, more specifically for the treatment of a cancer as detailed above, or more specifically for the treatment of glioma or glioblastoma.

In some embodiments, the compound or the composition of the invention is used in combination with a chemotherapeutic agent or radiotherapy.

Chemotherapeutic agents include, but are not limited to, DNA alkylating agents, topoisomerase inhibitors, endoplasmic reticulum stress inducing agents, a platinum compound, an antimetabolite, vincalkaloids, taxanes, epothilones, enzyme inhibitors, receptor antagonists, tyrosine kinase inhibitors, boron radiosensitizers (i.e. velcade), and chemotherapeutic combination therapies.

DNA alkylating agents are well known in the art and are used to treat a variety of tumors. Non-limiting examples of DNA alkylating agents are nitrogen mustards, such as Mechlorethamine, Cyclophosphamide (Ifosfamide, Trofosfamide), Chlorambucil (Melphalan, Prednimustine), Bendamustine, Uramustine and Estramustine; nitrosoureas, such as Carmustine (BCNU), Lomustine (Semustine), Fotemustine, Nimustine, Ranimustine and Streptozocin; alkyl sulfonates, such as Busulfan (Mannosulfan, Treosulfan); Aziridines, such as Carboquone, ThioTEPA, Triaziquone, Triethylenemelamine; Hydrazines (Procarbazine); Triazenes, such as Dacarbazine and Temozolomide; Altretamine and Mitobronitol.

Non-limiting examples of Topoisomerase I inhibitors include Campothecin derivatives including CPT-11 (irinotecan), SN-38, APC, NPC, campothecin, topotecan, exatecan-mesylate, 9-nitrocamptothecin, 9-aminocamptothecin, lurtotecan, rubitecan, silatecan, gimatecan, diflomotecan, extatecan, BN-80927, DX-8951f, and MAG-CPT as described in Pommier Y. (2006) Nat. Rev. Cancer 6 (10): 789-802 and U.S. Patent Publication No. 200510250854; Protoberberine alkaloids and derivatives thereof including berberrubine and coralyne as described in Li et al. (2000) Biochemistry 39 (24): 7107-7116 and Gatto et al. (1996) Cancer Res. 15(12):2795-2800; Phenanthroline derivatives including Benzo[i]phenanthridine, Nitidine, and fagaronine as described in Makhey et al. (2003) Bioorg. Med. Chem. 11 (8): 1809-1820; Terbenzimidazole and derivatives thereof as described in Xu (1998) Biochemistry 37(10):3558-3566; and Anthracycline derivatives including Doxorubicin, Daunorubicin, and Mitoxantrone as described in Foglesong et al. (1992) Cancer Chemother. Pharmacol. 30(2): 123-125, Crow et al. (1994) J. Med. Chem. 37(19):31913194, and Crespi et al. (1986) Biochem. Biophys. Res. Commun. 136(2):521-8. Topoisomerase II inhibitors include, but are not limited to, Etoposide and Teniposide. Dual topoisomerase I and II inhibitors include, but are not limited to, Saintopin and other Naphthecenediones, DACA and other Acridine-4-Carboxamindes, Intoplicine and other Benzopyridoindoles, TAS-103 and other 7H-indeno[2,1-c]Quinoline-7-ones, Pyrazoloacridine, XR 11576 and other Benzophenazines, XR 5944 and other Dimeric compounds, 7-oxo-7H-dibenz[f,ij]Isoquinolines and 7-oxo-7H-benzo[e]Perimidines, and Anthracenyl-amino Acid Conjugates as described in Denny and Baguley (2003) Curr. Top. Med. Chem. 3 (3): 339-353. Some agents inhibit Topoisomerase II and have DNA intercalation activity such as, but not limited to, Anthracyclines (Aclarubicin, Daunorubicin, Doxorubicin, Epirubicin, Idarubicin, Amrubicin, Pirarubicin, Valrubicin, Zorubicin) and Antracenediones (Mitoxantrone and Pixantrone). Examples of endoplasmic reticulum stress inducing agents include, but are not limited to, dimethyl-celecoxib (DMC), nelfmavir, celecoxib, and boron radiosensitizers (i.e. velcade (Bortezomib)).

Platinum based compound which is a subclass of DNA alkylating agents. Non-limiting examples of such agents include Carboplatin, Cisplatin, Nedaplatin, Oxaliplatin, Triplatin tetranitrate, Satraplatin, Aroplatin, Lobaplatin, and JM-216.

Non-limiting examples of antimetabolite agents include Folic acid based, i.e. dihydrofolate reductase inhibitors, such as Aminopterin, Methotrexate and Pemetrexed; thymidylate synthase inhibitors, such as Raltitrexed, Pemetrexed; Purine based, i.e. an adenosine deaminase inhibitor, such as Pentostatin, a thiopurine, such as Thioguanine and Mercaptopurine, a halogenated/ribonucleotide reductase inhibitor, such as Cladribine, Clofarabine, Fludarabine, or a guanine/guanosine: thiopurine, such as Thioguanine; or Pyrimidine based, i.e. cytosine/cytidine: hypomethylating agent, such as Azacitidine and Decitabine, a DNA polymerase inhibitor, such as Cytarabine, a ribonucleotide reductase inhibitor, such as Gemcitabine, or a thymine/thymidine: thymidylate synthase inhibitor, such as a Fluorouracil (5-FU). Equivalents to 5-FU include prodrugs, analogs and derivative thereof such as 5'-deoxy-5-fluorouridine (doxifluroidine), 1-tetrahydrofuranyl-5-fiuorouracil (ftorafur), Capecitabine (Xeloda), S—I (MBMS-247616, consisting of tegafur and two modulators, a 5-chloro-2,4dihydroxypyridine and potassium oxonate), ralititrexed (tomudex), nolatrexed (Thymitaq, AG337), LY231514 and ZD9331, as described for example in Papamicheal (1999) The Oncologist 4:478-487.

Examples of vincalkaloids, include, but are not limited to Vinblastine, Vincristine, Vinflunine, Vindesine and Vinorelbine.

Examples of taxanes include, but are not limited to docetaxel, Larotaxel, Ortataxel, Paclitaxel and Tesetaxel. An example of an epothilone is iabepilone. Examples of enzyme inhibitors include, but are not limited to farnesyltransferase inhibitors (Tipifamib); CDK inhibitor (Alvocidib, Seliciclib); proteasome inhibitor (Bortezomib); phosphodiesterase inhibitor (Anagrelide; rolipram); IMP dehydrogenase inhibitor (Tiazofurine); and lipoxygenase inhibitor (Masoprocol). Examples of receptor antagonists include, but are not limited to ERA (Atrasentan); retinoid X receptor (Bexarotene); and a sex steroid (Testolactone).

Examples of tyrosine kinase inhibitors include, but are not limited to inhibitors to ErbB: HER1/EGFR (Erlotinib, Gefitinib, Lapatinib, Vandetanib, Sunitinib, Neratinib); HER2/neu (Lapatinib, Neratinib); RTK class TTI: C-kit (Axitinib, Sunitinib, Sorafenib), FLT3 (Lestaurtinib), PDGFR (Axitinib, Sunitinib, Sorafenib); and VEGFR (Vandetanib, Semaxanib, Cediranib, Axitinib, Sorafenib); bcr-abl (Imatinib, Nilotinib, Dasatinib); Src (Bosutinib) and Janus kinase 2 (Lestaurtinib).

In a particular embodiment, the invention relates to a compound or a composition of the invention for use in the treatment of glioblastoma. In a more particular embodiment, a compound or a composition of the invention is for use in the treatment of glioblastoma by eliminating or reducing glioma-initiating cells (GICs) or forcing them to acquire a non-self-renewing state or to lose their tumorigenicity or to become vulnerable to therapies.

In a particular embodiment, the invention relates to a compound or a composition of the invention for use in the treatment of cancer, more specifically glioblastoma, in combination with a chemotherapeutic agent, such as defined above, more specifically with Temozolomide.

The pharmaceutical composition of the invention is more specifically for a simultaneous, separate or sequential administration, of the compound of the invention and at least one chemotherapeutic agent, such as defined above.

The invention will be further illustrated by the following examples. However, these examples should not be interpreted in any way as limiting the scope of the present invention.

EXAMPLES

Example 1

Synthesis of Active Compound/s 9a and 9b

The preparation of the alkyne derivative of bleomycin A5, B2 and A2 side chains is described below. The three side chains bear the same bithiazole scaffold whose synthesis is illustrated in Scheme 1.

Scheme 1. Synthesis of bithiazole compound 3.

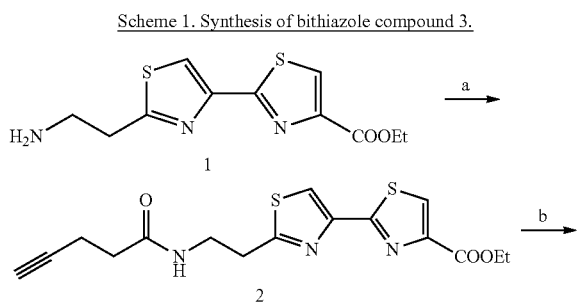

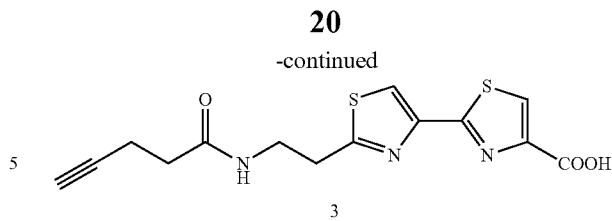

Reagents: a) EDC, HOBt, Et₃N, CH₂Cl₂/DMF, r.t., overnight; b) LiOH, H₂O/THF, room temperature (r.t.)., overnight.

The introduction of the alkyne group necessary for the cycloaddition reaction was obtained by reacting compound 1, prepared following previously published procedures (Quada J C Jr, Boturyn D, Hecht S M. Bioorg Med Chem. 2001 September; 9(9):2303-14) with 4-propanoic acid in the presence of EDC, HOBt and Et₃N in CH₂Cl₂ thus leading to desired alkyne 2 in 50% yield. Final hydrolysis of the ester group with LiOH led to alkyne 3 ready for the coupling the variable part of bleomycins' side chains.

Then, the alkyne derivative of the side chain of bleomycin A5 was prepared as illustrated in Scheme 2.

Scheme 2. Synthesis of the alkyne derivative of bleomycin A5 side chain 5.

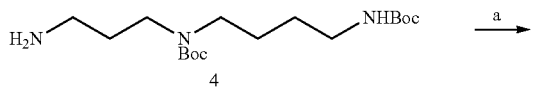

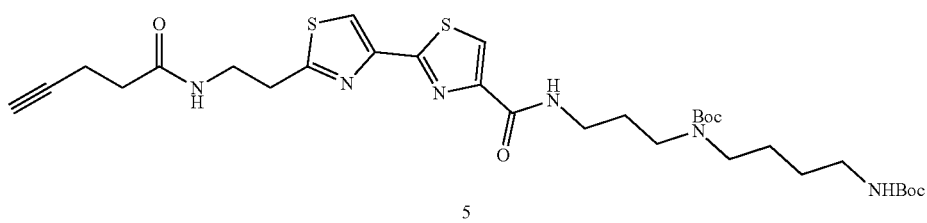

Reagents a) 3, EDC, HOBt, Et₃N, CH₂Cl₂/DMF, r.t., overnight.

Coupling of the amino group of compound 4, prepared following previously reported procedures (Kross J, Henner W D, Haseltine W A, Rodriguez L, Levin M D, Hecht S M. Biochemistry. 1982 Jul. 20; 21(15):3711-21), with the carboxyl group of 3 in the presence of EDC, HOBt and Et$_3$N in CH$_2$Cl$_2$, led to desired A5 side chain 5 in 77% yield.

Second, similarly to the preparation of compound 5, the alkyne derivative of the side chain of bleomycin B2 was synthesized as illustrated in Scheme 3.

Scheme 3. Synthesis of the alkyne derivative of bleomycin B2 side chain 7.

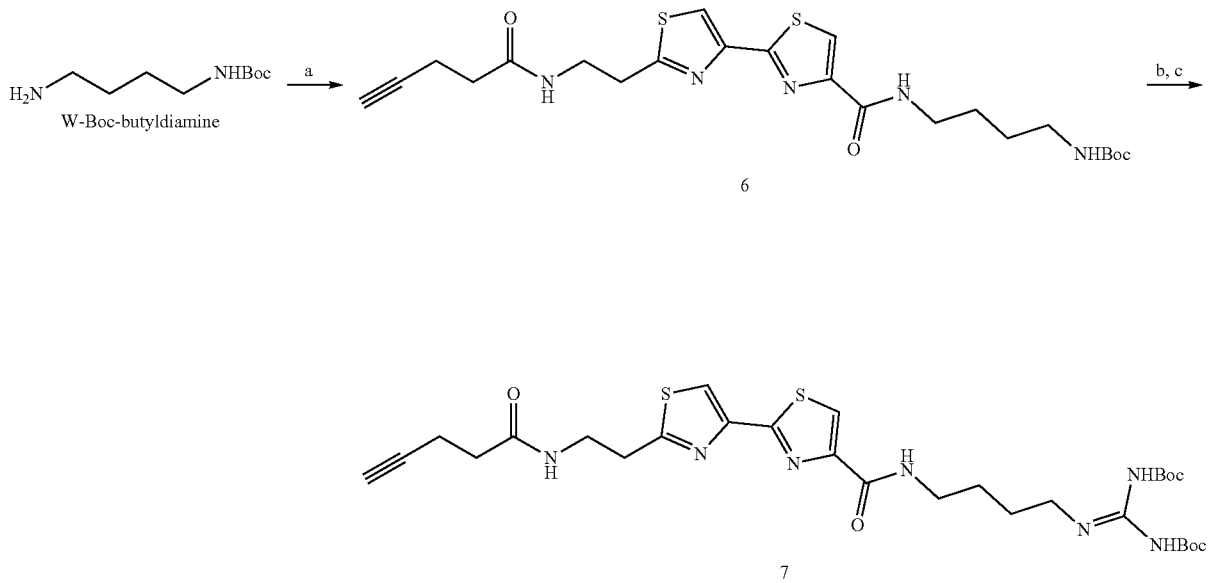

Reagents: a) 3, EDC, HOBt, Et$_3$N, CH$_2$Cl$_2$/DMF, room temperature (r.t.), overnight; b) TFA, CH$_2$Cl$_2$, r.t., 1 h; c) 1,3-di-Boc-2-(trifluoromethylsulfonyl)guanidine, CH$_2$Cl$_2$/MeOH, r.t., overnight.

Briefly, N-Boc-1,4-butylamine was coupled with carboxylic acid 3 in the presence of EDC, HOBt and Et$_3$N in CH$_2$Cl$_2$ leading to intermediate 6 in 50% yield. Deprotection of the amino group in the presence of trifluoroacetic acid in CH$_2$Cl$_2$, was followed by guanidylation reaction in the presence of 1,3-di-Boc-2-(trifluoromethylsulfonyl)guanidine affording desired B2 side chain analog 7 in 76% yields over two steps.

Alkynes 5 and 7 were then conjugated to NeoN$_3$ using 1,3-dipolar cycloaddition reaction in the presence of a catalytic amount of CuI in CH$_3$CN leading to Boc-protected conjugates 8a-b in 75-92% yields (Scheme 4).

Scheme 4. Synthesis of conjugates 9a-b.

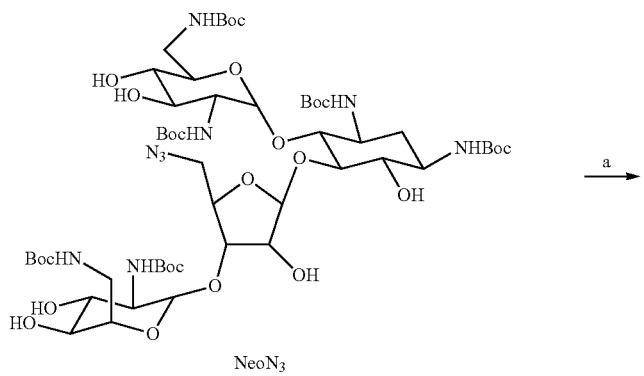

-continued
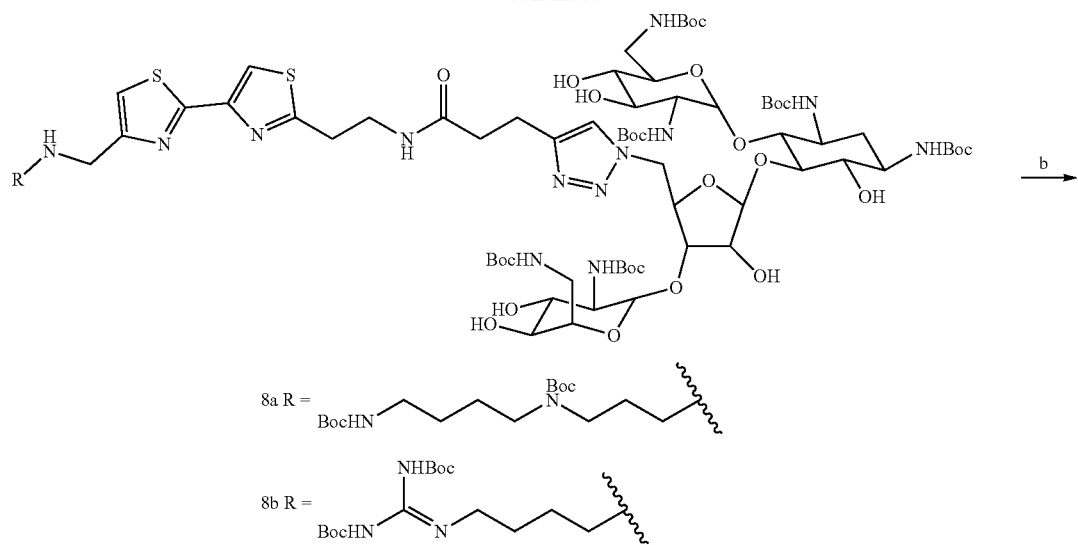
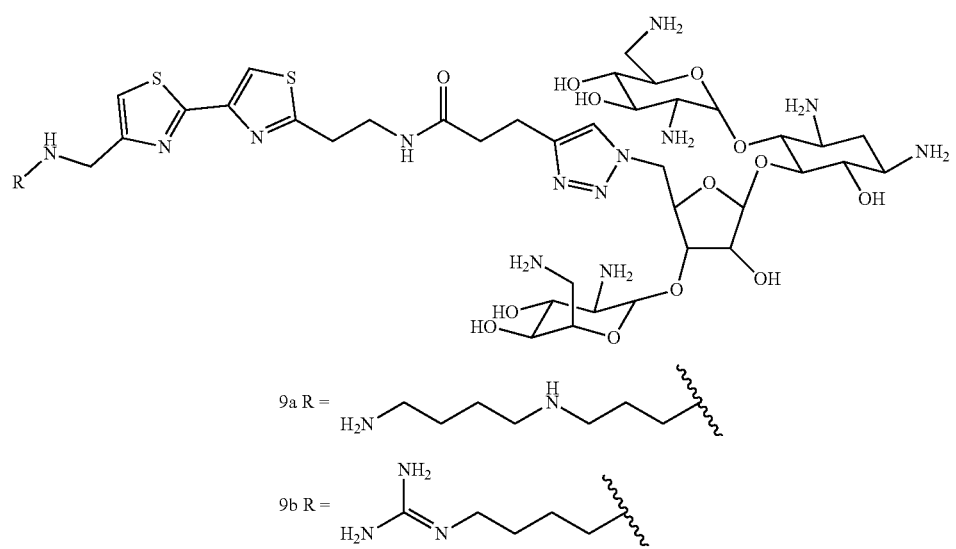
Reagents. a) 5 (for the synthesis of compound 8a) and 7 (for the synthesis of compound 8b), CuI, DIPEA, CH₃CN, r.t. overnight; b) TFA, CH₂Cl₂, r.t., overnight.

Following deprotection of Boc groups of compounds 8a and 8b in the presence of trifluoroacetic acid in CH$_2$Cl$_2$ led to final compounds 9a and 9b in 100% and 85% yields, respectively.

Example 2

Synthesis of Active Compounds 18a and 18b.

The preparation of analogs containing an aliphatic linker instead of a triazole one, began with the preparation of side chain 13 as illustrated in Scheme 5. First, compound 4 was coupled with compound 10 in the presence of HBTU and Et$_3$N in CH$_2$Cl$_2$ leading to desired compound 11 in 51% yield. This latter was deprotected in the presence of piperidine in DMF leading to compound 12 in 87% yield. Finally, 12 was coupled with succinic anhydride in CH$_2$Cl$_2$ thus leading to compound 13 in 84% yield.

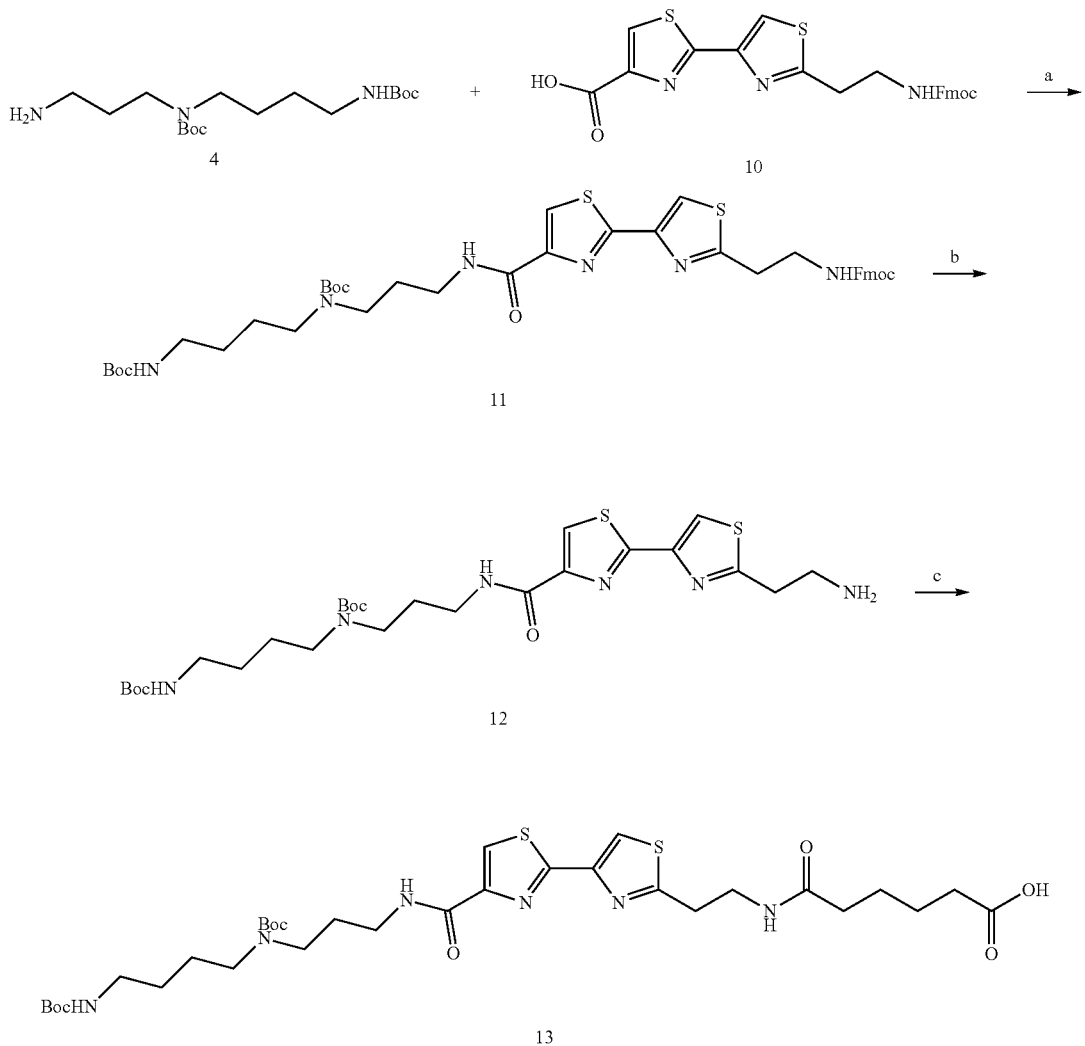

Scheme 5.
Synthesis of side chain intermediate 13.

Reagents:
a) HBTU, Et$_3$N, CH$_2$CL$_2$, r.t., overnight;
b) piperidine, DMF, r.t. 2 h;
c) succinic anhydride, CH$_2$Cl$_2$, r.t., overnight.

The synthesis of the second side chain intermediate 16 is illustrated in Scheme 6. As previously performed for the preparation of 13, compound 10 was coupled with commercially available N-Boc-1,3-propanediamine in the presence of HOSu, EDC and Et₃N in CH₂Cl₂ leading to compound 14 in 56% yield. Deprotection in the presence of piperidine in DMF led to compound 15 in 89% yield. Final coupling of 15 with succinic anhydride in CH₂Cl₂ led to desired compound 16 in 91% yield.

Scheme 6. Synthesis of side chain intermediate 16.

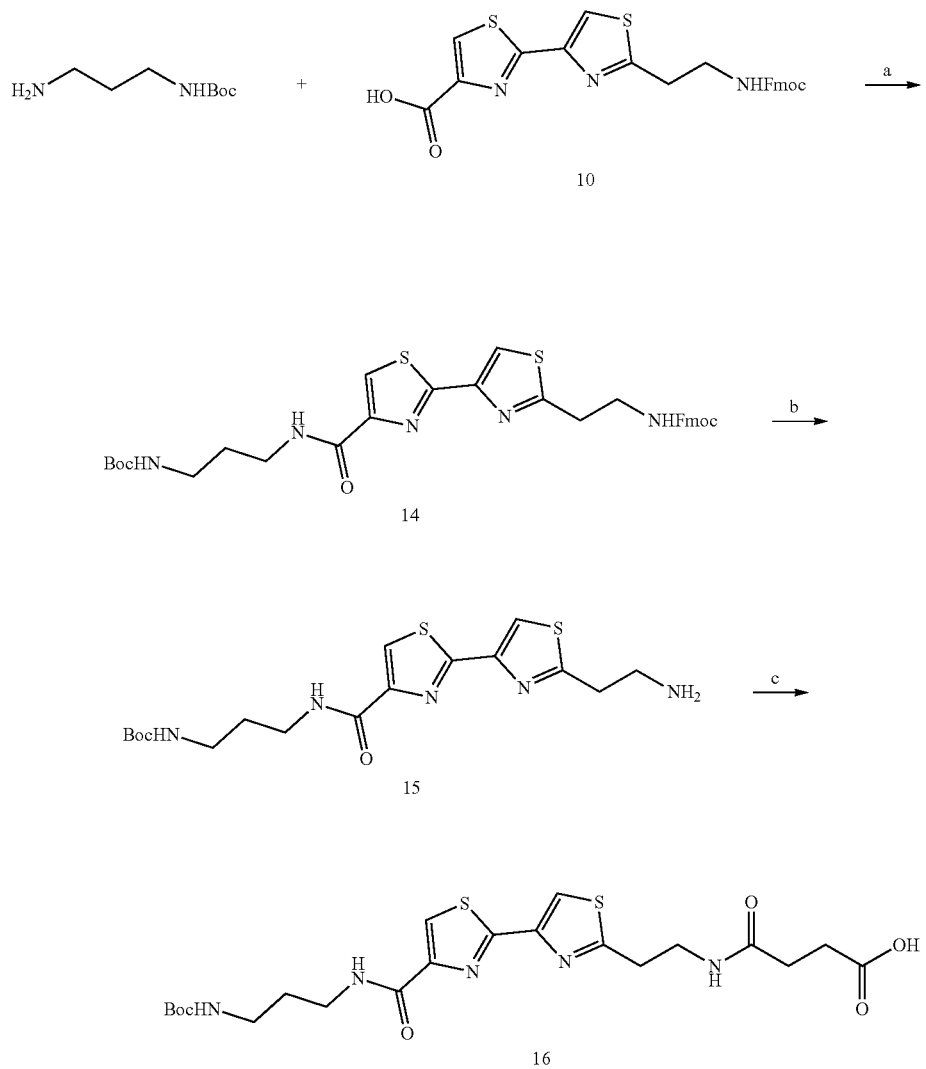

Reagents: a) HOSu, EDC, CH₂Cl₂, r.t., overnight; b) piperidine, DMF, r.t. 2 h; c) succinic anhydride, CH₂Cl₂, r.t., overnight.

The synthesis of desired analogs 18a and 18b is illustrated in Scheme 7. Modified compound neomycin containing an amino group in position 5″ was first prepared following reported procedures and then coupled with side chain intermediates 13 and 16 in the presence of HOSu and EDC in CH₂Cl₂ leading to compounds 17a and 17b in 50 and 39%, respectively. Following deprotection of the Boc protecting groups in the presence of TFA in CH₂Cl₂ led to desired compounds 18a and 18b in 86 and 100% yields, respectively.

Scheme 7.
Synthesis of active compounds 18a and 18b.
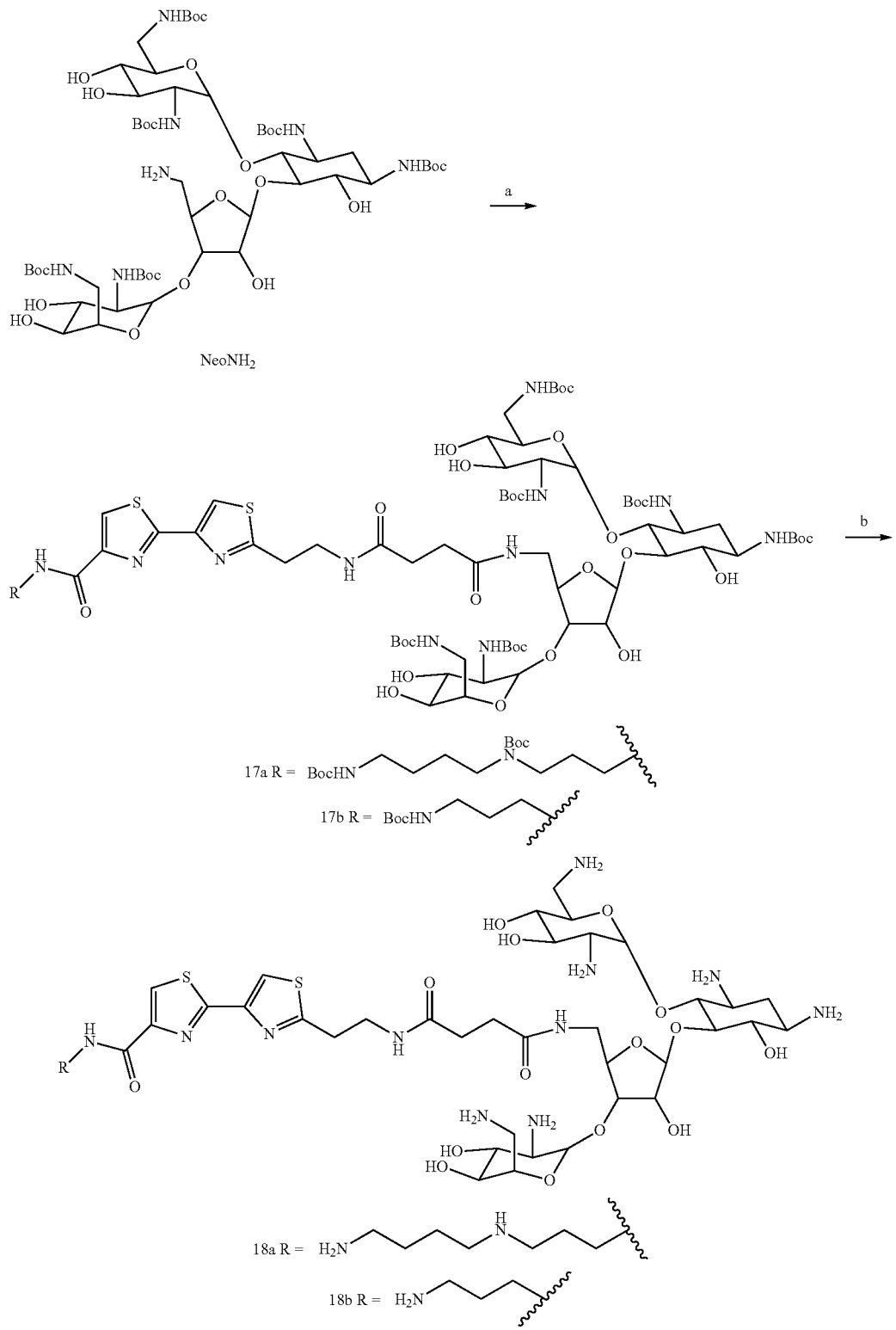
Reagents:
a) 13 (for the preparation of 17a) and 16 (for the preparation of 17b), HOSu, EDC, CH$_2$Cl$_2$, r.t., overnight;
b) TFA, CH$_2$Cl$_2$, r.t. overnight.

Experimental Section
General Methods

Reagents and solvents were purchased from Aldrich or Alfa Æsar and used without further purification. All reactions involving air or moisture-sensitive reagents or intermediates were performed under an argon atmosphere. Flash column chromatographies were carried out on silica gel (Merck, SDS 60 Å, 40-63 µm, VWR). Analytical thin-layer chromatography (TLC) was conducted on Fluka Analytical precoated silica gel on TLC Al foils with fluorescent indicator and compounds were visualized by irradiation (254 nm) or by staining with ninhydrin stain or anisaldehyde stain. $^1$H and $^{13}$C NMR spectra were recorded on a Bruker AC 200 MHz or a Bruker AC 500 MHz spectrometer. Chemical shifts are reported in parts per million (ppm, δ) referenced to the residual $^1$H resonance of the solvent (CDCl$_3$, δ 7.26; CD$_3$OD δ 3.31; DMSO-d$_6$ δ 2.50). Splitting patterns are designated as follows: s (singlet), d (doublet), t (triplet) and m (multiplet), br (broad). Coupling constants (J values) are listed in hertz (Hz). Low resolution mass spectra (MS) were obtained on ThermoFinnigan (San Jose, CA) ion trap Mass spectrometer fitted with an Electrospray source operating in the positive and negative mode. The Mass spectrometer is hyphenated with an Agilent (Palo Alto, Ca) 1100 HPLC system including degasser, quaternary pump, autosampler, column oven and Diode Array Detector. HPLC was performed using a Water Alliance 2695 pump coupled with Waters 996 photodiode array detector and a Thermo Scientific RP-C$_{18}$ column (250×4.6 mm, 5µ for analytical HPLC and 250×10 mm, 5µ for semipreparative HPLC). All HPLC analyses were run at room temperature. A gradient of CH$_3$CN containing 0.1% TFA (Eluent B) in water containing 0.1% TFA (Eluent A) from 5 to 60% over 30 minutes was used at a flow rate of 1 mL/min for analytical HPLC and 3.5 mL min for semipreparative HPLC.

General Procedure for the 1,3-Dipolar Cycloaddition (General Procedure A). To a solution of NeoN$_3$ (Vo D. D., Staedel C., Zehnacker L., Benhida R., Darfeuille F., Duca M. Targeting the production of oncogenic microRNAs with multimodal synthetic small molecules *ACS Chem. Biol.* 2014 9, 711-721) (100 mg, 0.0806 mmol) and alkynes 5 and 7 (0.0887 mmol, 1.1 eq.) in CH$_3$CN (4 mL) were added copper iodide (3.20 mg, 0.0322 mmol, 0.4 eq.) and N,N-diisopropylethylamine (42.0 µL, 0.484 mmol, 6 eq.) at room temperature and the reaction mixture was stirred overnight. The solvent was then removed under reduced pressure and the crude residue was purified by flash chromatography on a silica gel column using a mixture CH$_2$Cl$_2$/MeOH 95:5 as the eluent leading to the desired compounds 8a-b as colorless solids.

General Procedure for Boc Groups Deprotection (General Procedure B). tert-Butoxycarbonyl (Boc) removal was obtained by treatment of compounds 8a-b and 17a-b (0.06 mmol) with TFA (0.6 mmol, 10 eq.) in CH$_2$Cl$_2$ (2 mL) after stirring the reaction mixture overnight. The solvent and the residues of TFA were then removed under reduced pressure. Final precipitation in a mixture Et$_2$O/MeOH 49:1 led to pure compounds 9a-b and 18a-b as colorless solids (TFA salts).

Ethyl 2'-(2-(pent-4-ynamido)ethyl)-[2,4'-bithiazole]-4-carboxylate (2). To a solution of commercially available 4-pentynoic acid (346 mg, 3.53 mmol, 1 eq.) in a mixture of CH$_2$Cl$_2$/DMF 1:1 (20 mL) at room temperature, EDC (743 mg, 3.88 mmol, 1.1 eq.), HOBt (586 mg, 3.88 mmol, 1.1 eq.) and Et$_3$N (1.48 mL, 10.6 mmol, 3 eq.) were added. After stirring the reaction mixture at room temperature for 15 minutes, compound 1 (1 g, 3.53 mmol) was added and the resulting reaction mixture was stirred at room temperature overnight. After the evaporation of the solvent under reduced pressure, CH$_2$Cl$_2$ was added and the organic layer was washed with saturated NH$_4$Cl (50 mL), H$_2$O (50 mL) and brine (50 mL). The organic phases were concentrated under reduced pressure and the resulting product was purified by flash column chromatography using a mixture CH$_2$Cl$_2$/MeOH 98.5:1.5 as the eluent. This led to pure desired compound 2 as a colorless solid: yield 650 mg (50%); R$_f$=0.10 (cyclohexane/ethyl acetate 1:1); $^1$H NMR (200 MHz, CDCl$_3$) δ (ppm): 8.16 (s, 1H), 8.02 (s, 1H), 6.52 (br, 1H), 4.43 (q, J=7.1 Hz, 2H), 3.76 (q, J=6.1 Hz, 2H), 3.23 (t, J=6.1 Hz, 2H), 2.58-2.33 (m, 4H), 1.92 (t, J=2.5 Hz, 1H), 1.41 (t, J=7.1 Hz, 3H); MS (ESI), m/z 364.6 (M+H)$^+$ (theoretical m/z 364.1).

2'-(2-(pent-4-ynamido)ethyl)-[2,4'-bithiazole]-4-carboxylic acid (3). To a solution of compound 2 (650 mg, 1.79 mmol) in a mixture of H$_2$O/THF 1:1 (60 mL) was added a 2N solution of LiOH (1.79 mL, 3.58 mmol, 2 eq.). The reaction mixture was stirred at room temperature overnight, cooled to 0° C. and neutralized using a 1M solution of HCl (6 mL). During evaporation of THF under reduced pressure, a precipitate appeared. Filtration and evaporation to dryness of this residue led to desired compound 3 as a colorless solid: yield 578 mg (96%); R$_f$=0.1 (CH$_2$Cl$_2$/MeOH 9:1); $^1$H NMR (200 MHz, CD$_3$OD) δ (ppm): 8.35 (s, 1H), 8.20 (s, 1H), 3.64 (t, J=6.8 Hz, 2H), 3.26 (t, J=6.8 Hz, 2H), 2.51-2.33 (m, 4H), 2.24 (t, J=2.4 Hz, 1H); $^{13}$C NMR (50 MHz, CD$_3$OD) δ (ppm): 174.3, 170.7, 164.9, 164.1, 149.3, 149.2, 83.5, 70.4, 40.1, 36.1, 33.7, 15.7. MS (ESI), m/z 336.6 (M+H)$^+$ (theoretical m/z 336.0).

tert-Butyl (4-((tert-butoxycarbonyl)amino)butyl)(3-(2'-(2-(pent-4-ynamido)ethyl)-[2,4'-bithiazole]-4-carboxamido)propyl)carbamate (5). Compound 3 (100 mg, 0.298 mmol) was dissolved in a mixture CH$_2$Cl$_2$/DMF 1:1 (6 mL) and EDC (69 mg, 0.358 mmol, 1.2 eq.), HOBt (54.4 mg, 0.358 mmol, 1.2 eq.) and Et$_3$N (83.4 µL, 0.596 mmol, 2 eq.) were added. After stirring the reaction mixture at room temperature 15 minutes, compound 4 (155 mg, 0.447 mmol, 1.5 eq.) was added. After stirring at room temperature overnight, solvent was evaporated under reduced pressure and CH$_2$Cl$_2$ (60 mL) was added. The organic phase was washed with saturated NH$_4$Cl (10 mL), H$_2$O (30 mL) and brine (30 mL), then concentrated under reduced pressure. The resulting product was finally purified by flash column chromatography using a mixture CH$_2$Cl$_2$/MeOH 97:3 as the eluent leading to compound 5 as a slightly yellow solid: yield 153 mg (77%); R$_f$=0.17 (CH$_2$Cl$_2$/MeOH 97:3); $^1$H NMR (200 MHz, CDCl$_3$) δ (ppm): 8.12 (br, 1H), 8.08 (s, 1H), 7.95 (s, 1H), 6.50 (br, 1H), 4.63 (br, 1H), 3.77 (t, J=6.1 Hz, 2H), 3.57-3.00 (m, 10H), 2.61-2.31 (m, 4H), 2.00-1.70 (m, 3H), 1.65-1.24 (m, 22H); $^{13}$C NMR (50 MHz, CDCl$_3$) δ (ppm): 171.0, 169.0, 161.1, 156.0, 150.9, 148.5, 123.1, 116.5, 82.8, 79.6, 69.3, 46.7, 43.9, 40.1, 38.4, 35.3, 32.7, 28.5, 28.4, 27.4, 14.8; MS (ESI), m/z 686.2 (M+Na)$^+$ (theoretical m/z 685.3).

tert-Butyl-(4-(2'-(2-(pent-4-ynamido)ethyl)-[2,4'-bithiazole]-4-carboxamido)butyl)carbamate (6). Compound 3 (200 mg, 0.597 mmol) was dissolved in a mixture CH$_2$Cl$_2$/DMF 1:1 (12 mL) and EDC (127 µL, 0.716 mmol, 1.2 eq.), HOBt (109 mg, 0.716 mmol, 1.2 eq.) and Et$_3$N (167 µL, 1.19 mmol, 2 eq.) were added. After stirring at room temperature 15 minutes, tert-butyl (4-aminobutyl)carbamate (169 mg, 0.896 mmol, 1.5 eq.) was added and the reaction mixture was stirred overnight at room temperature. After evaporation of the solvent under reduced pressure, CH$_2$Cl$_2$ (100 mL) was added and washed with saturated NH$_4$Cl (10 mL), H$_2$O (30 mL) and brine (30 mL). The organic layers were concentrated to dryness and the resulting residue was purified by flash column chromatography using a mixture CH$_2$Cl$_2$/MeOH 97:3 as the eluent leading to desired compound 7 as a slightly yellow solid: yield 151 mg (50%); R$_f$=0.17 (CH$_2$Cl$_2$/MeOH 97:3); $^1$H NMR (200 MHz, CDCl$_3$) δ (ppm): 8.09 (s, 1H), 7.88 (s, 1H), 7.45 (t, J=5.6 Hz, 1H), 6.48 (br, 1H), 4.63 (br, 1H), 3.77 (q, J=6.1 Hz, 2H), 3.48 (q, J=6.4 Hz, 2H), 3.25 (t, J=6.1 Hz, 2H), 3.16 (q, J=6.1 Hz, 2H), 2.59-2.34 (m, 4H), 1.93 (t, J=2.5 Hz, 1H), 1.75-1.50 (m, 4H), 1.43 (s, 9H); MS (ESI), m/z 528.8 (M+Na)$^+$ (theoretical m/z 528.2).

tert-Butyl-(4-(2'-(2-(pent-4-ynamido)ethyl)-[2,4'-bithiazole]-4-N,N'-diBoc-guanidinyl)butyl)carbamate (7). Compound 6 (151 mg, 0.298 mmol) was dissolved in CH$_2$Cl$_2$ (4 mL) and TFA (0.46 mL, 5.97 mmol, 20 eq.) was added. After stirring the reaction mixture at room temperature for 1 h, the solvent was evaporated under reduced pressure and the crude product was used in the following step without further purification. This crude product was dissolved in a mixture of CH$_2$Cl$_2$/MeOH 9:1 (2.2 mL) and 1,3-di-Boc-2-(trifluoromethylsulfonyl)guanidine (176 mg, 0.799 mmol, 1.5 eq.) and Et$_3$N (125 µL, 0.894 mmol, 3 eq.) were added. After stirring the reaction mixture overnight, solvent was evaporated under reduced pressure and the resulting residue was purified by flash column chromatography using a mixture CH$_2$Cl$_2$/MeOH 97:3 as the eluent leading to desired compound 7 as a slightly yellow solid: yield 148 mg (76% over 2 steps); R$_f$=0.29 (CH$_2$Cl$_2$/MeOH 95:5); $^1$H NMR (200 MHz, CDCl$_3$) δ (ppm): 8.36 (br, 1H), 8.11 (s, 1H), 7.89 (s, 1H), 7.51 (t, J=6.1 Hz, 1H), 6.54 (br, 1H), 4.63 (br, 1H), 3.77 (q, J=6.1 Hz, 2H), 3.59-3.36 (m, 4H), 3.25 (t, J=6.2 Hz, 2H), 2.59-2.35 (m, 4H), 1.93 (t, J=2.5 Hz, 1H), 1.77-1.62 (m, 4H), 1.48 (s, 18H); $^{13}$C NMR (50 MHz, CDCl$_3$) δ (ppm): 171.3, 169.0, 163.4, 162.2, 161.2, 156.2, 153.3, 150.6, 148.3, 123.7, 116.5, 83.2, 82.7, 79.5, 69.5, 40.4, 38.9, 38.4, 35.3, 32.6, 28.2, 28.0, 26.9, 26.4, 14.8; MS (ESI), m/z 649.0 (M+H)$^+$ (theoretical m/z 648.3).

tert-Butyl (4-((tert-butoxycarbonyl)amino)butyl)(3-(2'-(2-(3-(1-methyl-1H-1,2,3-triazol-4-yl)propanamido)ethyl)-[2,4'-bithiazole]-4-carboxamido)propyl)carbamate-Boc-Neo (8a). General procedure A was employed for the reaction between NeoN$_3$ and alkyne 5 leading to compound 8a as a colorless solid: yield 116 mg (76%); R$_f$=0.2 (CH$_2$Cl$_2$/MeOH 95/5); $^1$H NMR (500 MHz, CD$_3$OD) δ (ppm): 8.20 (s, 1H), 7.98 (s, 1H), 5.41 (s, 1H), 5.11 (s, 1H), 4.94 (s, 1H), 4.68-4.51 (m, 1H), 4.42-4.11 (m, 3H), 3.82-3.73 (m, 2H), 3.70-3.32 (m, 18H), 3.28-3.11 (m, 4H), 3.10-2.97 (m, 4H), 2.75-2.52 (m, 2H), 2.05-1.78 (m, 3H), 1.62-1.29 (m, 77H); $^{13}$C NMR (125 MHz, CD$_3$OD) δ (ppm): 159.2, 158.9, 158.6, 158.5, 158.2, 111.5, 100.5, 98.9, 86.1, 81.0, 80.8, 80.7, 80.4, 80.3, 79.9, 75.5, 74.7, 74.5, 73.3, 72.9, 72.8, 71.7, 69.1, 56.7, 54.8, 53.6, 51.1, 49.2, 42.5, 42.1, 41.1, 40.4, 35.9, 33.9, 29.0, 28.9, 28.8, 28.4; MS (ESI), m/z 1903.9 (M+H)$^+$ (theoretical m/z 1902.9).

tert-Butyl-N-(4-((diaminomethylene)amino)butyl)-2'-(2-(3-(1-methyl-1H-1,2,3-triazol-4-yl)propanamido)ethyl)-[2,4'-bithiazole]-4-carboxamide-Boc-Neo (8b). General procedure A was employed for the reaction between Neo-N$_3$ and alkyne 7 leading to compound 8b as a colorless solid: yield 129 mg (85%); R$_f$=0.46 (CH$_2$Cl$_2$/MeOH 92:8); $^1$H NMR (500 MHz, CD$_3$OD) δ (ppm): 8.19 (s, 1H), 8.17 (s, 1H), 7.92 (s, 1H), 5.42 (s, 1H), 5.11 (s, 1H), 4.94 (s, 1H), 4.84-4.78 (m, 1H), 4.65-4.58 (m, 1H), 4.41-4.10 (m, 3H), 3.96 (t, J=6.3 Hz, 1H), 3.95-3.86 (m, 1H), 3.76-3.71 (m, 2H), 3.67-3.34 (m, 16H), 3.30-2.97 (m, 6H), 2.69-2.53 (m, 2H), 2.02-1.89 (m, 3H), 1.76-1.64 (m, 4H), 1.62-1.19 (m, 75H); $^{13}$C NMR (125 MHz, CD$_3$OD) δ (ppm): 174.9, 170.9, 164.6, 164.0, 163.4, 159.3, 158.9, 158.5, 158.3, 158.1, 158.0, 157.6, 154.2, 151.6, 149.4, 125.6, 125.2, 119.0, 111.4, 100.5, 98.8, 86.1, 84.5, 81.0, 80.8, 80.7, 80.6, 80.5, 80.4, 80.3, 75.5, 74.6, 74.5, 73.2, 72.9, 72.8, 71.6, 69.0, 56.7, 55.8, 53.6, 53.3, 52.6, 51.1, 49.9, 43.8, 42.5, 42.1, 41.5, 40.3, 40.1, 36.6, 35.9, 33.9, 33.1, 28.9, 28.8, 28.6, 28.3, 28.0, 27.7, 22.7, 13.3; MS (ESI), m/z 1687.8 (M+3H-2Boc)$^+$ (theoretical m/z 1687.8).

N-(3-((4-Aminobutyl)amino)propyl)-2'-(2-(3-(1-methyl-1H-1,2,3-triazol-4-yl)propanamido)ethyl)-[2,4'-bithiazole]-4-carboxamide-neomycin (9a). General procedure B was applied to compound 8a leading to desired compound 9a as a colorless solid: yield 66 mg (100%); retention time 14.5 min; $^1$H NMR (500 MHz, CD$_3$OD) δ (ppm): 8.25 (s, 1H), 8.18 (s, 1H), 7.96 (s, 1H), 5.95 (d, J=3.6 Hz, 1H), 5.42 (d, J=3.8 Hz, 1H), 5.34 (d, J=1.4 Hz, 1H), 4.94-4.86 (m, 1H), 4.71 (dd, J=14.9, 5.6 Hz, 1H), 4.52-4.44 (m, 2H), 4.35-4.31 (m, 1H), 4.17-3.97 (m, 5H), 3.84 (t, J=9.0 Hz, 1H), 3.77 (t, J=4.1 Hz, 1H), 3.72-3.38 (m, 13H), 3.31-3.20 (m, 4H), 3.15-2.95 (m, 9H), 2.65-2.56 (m, 2H), 2.49-2.40 (m, 1H), 2.10-1.98 (m, 3H), 1.87-1.72 (m, 4H). $^{13}$C NMR (125 MHz, CD$_3$OD) δ (ppm): 174.8, 162.1, 161.9, 161.8, 161.7, 111.3, 97.0, 96.7, 86.7, 81.7, 77.8, 76.7, 74.8, 74.1, 72.8, 72.2, 71.9, 69.4, 69.3, 69.2, 55.1, 54.8, 53.0, 52.1, 50.2, 48.3, 46.6, 41.7, 40.2, 40.0, 37.1, 36.2, 33.9, 33.8, 29.5, 28.0, 27.8, 25.6, 24.4, 22.6; HRMS (ESI), m/z 1102.5138 (M+H)$^+$ (C$_{44}$H$_{76}$N$_{15}$O$_{14}$S$_2$ requires 1102.5132).

N-(4-((Diaminomethylene)amino)butyl)-2'-(2-(3-(1-methyl-1H-1,2,3-triazol-4-yl)propanamido)ethyl)-[2,4'-bithiazole]-4-carboxamide-neomycin (9b). General procedure B was applied to compound 8b leading to the desired product 9b as a colorless solid: yield 97 mg (100%); retention time 15.9 min; $^1$H NMR (500 MHz, CD$_3$OD) δ (ppm): 8.20 (s, 1H), 8.17 (s, 1H), 7.94 (s, 1H), 5.94 (d, J=3.7 Hz, 1H), 5.42 (d, J=3.9 Hz, 1H), 5.35 (d, J=1.5 Hz, 1H), 4.86-4.82 (m, 1H), 4.71 (dd, J=14.9, 5.6 Hz, 1H), 4.52-4.44 (m, 2H), 4.35-4.31 (m, 1H), 4.17-3.97 (m, 5H), 3.84 (t, J=9.0 Hz, 1H), 3.74 (t, J=4.3 Hz, 1H), 3.71-3.39 (m, 13H), 3.31-3.20 (m, 6H), 3.02 (t, J=7.2 Hz, 2H), 2.61 (t, J=7.2 Hz, 2H), 2.49-2.40 (m, 1H), 2.10-1.98 (m, 1H), 1.77-1.64 (m, 4H); $^{13}$C NMR (125 MHz, CD$_3$OD) δ (ppm): 174.7, 170.9, 163.6, 158.7, 151.6, 149.4, 148.6, 125.2, 125.0, 118.9, 111.3, 97.0, 96.7, 86.7, 81.7, 77.8, 76.7, 74.8, 74.1, 72.8, 72.2, 71.9, 69.4, 69.3, 69.2, 55.9, 55.1, 53.0, 52.9, 51.2, 50.2, 49.9, 43.8, 42.2, 41.7, 40.2, 39.8, 36.2, 33.8, 29.5, 28.0, 27.9, 27.3, 22.6, 18.8, 17.3; MS (ESI), m/z 1087.4770 (M+H)$^+$ (C$_{42}$H$_{70}$N$_{16}$O$_{14}$S$_2$ requires 1087.4772).

tert-Butyl (3-(2'-(2-((((9H-fluoren-9-yl)methoxy)carbonyl)amino)ethyl)-[2,4'-bithiazole]-4-carboxamido)propyl)(4-((tert-butoxycarbonyl)amino)butyl)carbamate (11). To a solution of 2'-(2-((((9H-fluoren-9-yl)methoxy)carbonyl)amino)ethyl)-[2,4'-bithiazole]-4-carboxylic acid 10 (1.24 g, 2.60 mmol) in anhydrous CH$_2$Cl$_2$ (10 mL), HBtU (1.18 g, 3.12 mmol, 1.2 eq) and triethylamine (724 µL, 5.20 mmol, 2 eq) were added. The reaction mixture was stirred at room temperature for 30 min before adding spermidine 4 (0.99 g, 2.86 mmol, 11 eq). After stirring the reaction mixture at room temperature overnight, a saturated NH$_4$Cl solution was added and the reaction mixture was extracted with CH$_2$Cl$_2$. The combined organic phases were washed with water and brine, dried over Na$_2$SO$_4$ and then concentrated under reduced pressure. The crude residue was purified by flash column chromatography using a mixture CH$_2$Cl$_2$/MeOH 90:10 as the eluent to provide pure compound 11 as a colorless oil: yield 1.06 g (51%); R$_f$=0.39 (CH$_2$Cl$_2$/MeOH 9:1); $^1$H NMR (400 MHz, CDCl$_3$) δ 8.09 (s, 1H), 7.96 (br s, 1H), 7.74 (d, J=7.5 Hz, 2H), 7.58 (d, J=7.5 Hz, 2H), 7.38 (t, J=7.4 Hz, 2H), 7.27 (t, J=7.4 Hz, 2H), 5.56 (NH, 1H), 4.63 (NH, 1H), 4.41 (d, J=6.9 Hz, 2H), 4.21 (t, J=6.8 Hz, 1H), 3.72-3.64 (m, 2H), 3.47 (br s, 2H), 3.33 (br s, 2H), 3.24 (t, J=6.1 Hz, 2H), 3.22-3.16 (m, 2H), 3.16-3.06 (m, 2H), 1.83 (br s, 2H), 1.64-1.50 (m, 2H), 1.50-1.39 (m, 20H); $^{13}$C NMR (50 MHz, CDCl$_3$) δ 168.94, 162.28, 161.33, 156.48, 156.29, 156.13, 151.07, 148.74, 143.98, 141.44, 127.81, 127.13, 125.15, 123.31, 120.10, 116.56, 79.72, 66.79, 47.37, 46.84, 44.10, 40.30, 40.14, 36.33, 33.24, 28.61, 28.53, 28.28, 27.55, 25.96; MS (ESI) m/z 804.87 (M+H)$^+$.

tert-Butyl-(3-(2'-(2-aminoethyl)-[2,4'-bithiazole]-4-carboxamido)propyl)(4-((tert-butoxycarbonyl)amino)butyl) carbamate (12). To a solution of compound 11 (1.06 g, 1.32 mmol) in DMF (10 mL), piperidine (2.5 mL) was added. The reaction mixture was stirred at room temperature for 3 h, concentrated under reduced pressure and the residue was purified by flash column chromatography using a mixture CH$_2$Cl$_2$/MeOH 90:10 as the eluent to provide pure compound 12 as a colorless solid: yield 668 mg (87%); R$_f$=0.29 (CH$_2$Cl$_2$/MeOH 95:05); $^1$H NMR (400 MHz, CD$_3$OD) δ 8.17 (s, 1H), 8.15 (s, 1H), 3.43 (t, J=6.7 Hz, 2H), 3.40-3.30 (m, 2H), 3.27-3.20 (m, 4H), 3.13 (t, J=6.52 Hz, 2H), 3.04 (t, J=6.7 Hz, 2H), 1.87 (br s, 2H), 1.57 (br s, 2H), 1.51-1.38 (m, 20H); $^{13}$C NMR (50 MHz, CD$_3$OD) δ 171.38, 164.00, 163.40, 158.51, 157.55, 151.71, 149.54, 124.85, 118.26, 80.97, 79.78, 51.06, 48.06, 45.53, 42.14, 40.97, 38.04, 36.64, 34.80, 29.60, 28.80, 28.73, 28.34, 26.63; MS (ESI) m/z 583.07 (M+H)$^+$.

4-((2-(4-((3-((tert-Butoxycarbonyl)(4-((tert-butoxycarbonyl)amino)butyl)amino)propyl)carbamoyl)-[2,4'-bithiazol]-2'-yl)ethyl)amino)-4-oxobutanoic acid (13). To a solution of compound 12 (150 mg, 0.26 mmol) in CH$_2$Cl$_2$ (1.2 mL) was added succinic anhydride (30.9 mg, 0.31 mmol, 1.2 eq). The reaction mixture was stirred overnight at room temperature, and then the solvent was removed under reduced pressure. The crude residue was purified by flash column chromatography using a mixture CH$_2$Cl$_2$/MeOH 95:5 as the eluent to provide pure compound 13 as a colorless solid: 148 mg (84%); R$_f$=0.25 (CH$_2$Cl$_2$/MeOH 95:5); $^1$H NMR (400 MHz, CDCl$_3$) δ 9.68 (br s, OH), 8.11 (br s, NH), 8.01 (s, 1H), 7.85 (s, 1H), 7.08 (br s, NH), 4.76 (br s, NH), 3.64 (dd, J=6.1, 12.2 Hz, 2H), 3.37 (br s, 2H), 3.24 (br s, 2H), 3.17 (t, J=6.4 Hz, 2H), 3.11 (br s, 2H), 3.04 (br s, 2H), 2.61 (t, J=6.7 Hz, 2H), 2.46 (t, J=6.7 Hz, 2H), 1.75 (br s, 2H), 1.55-1.42 (m, 2H), 1.38 (s, 9H), 1.35 (s, 9H); $^{13}$C NMR (101 MHz, CDCl$_3$) δ 175.54, 172.51, 169.00, 162.13, 161.33, 156.11, 155.52, 150.59, 148.32, 123.43, 116.71, 79.70, 79.12, 46.75, 44.01, 40.15, 38.79, 36.35, 32.69, 30.91, 29.68, 28.45, 28.39, 28.11, 27.33, 25.83; MS (ESI) m/z 682.93 (M+H)$^{1+}$.

(9H-fluoren-9-yl)methyl (2-(4-((3-((tert-butoxycarbonyl)amino)propyl)carbamoyl)-[2,4'-bithiazol]-2'-yl)ethyl)carbamate (14). To a solution of compound 10 (292.0 mg, 0.612 mmol) in anhydrous CH$_2$Cl$_2$ (2 mL), EDC (199.3 mg, 1.04 mmol, 1.7 eq) and HOSu (119.7 mg, 1.04 mmol, 1.7 eq) were added. The reaction mixture was stirred at room temperature for 2 h before adding N-Boc-1,3-propanediamine (149.9 mg, 0.86 mmol, 1.4 eq). The reaction mixture was stirred overnight at room temperature, water was added and the mixture was extracted with CH$_2$Cl$_2$. The combined organic phases were washed with water and brine, dried over Na$_2$SO$_4$ and then concentrated under reduced pressure. The crude residue was purified by flash column chromatography using a mixture CH$_2$Cl$_2$/MeOH 98:2 as the eluent to provide pure compound 14 as a colorless solid: 216 mg (56%); R$_f$=0.69 (CH$_2$Cl$_2$/MeOH 95:05); $^1$H NMR (400 MHz, CDCl$_3$) δ 8.08 (s, 1H), 7.79-7.69 (m, 2H+1NH), 7.56 (d, J=7.5 Hz, 2H), 7.36 (t, J=7.4 Hz, 2H), 7.28-7.21 (t, J=7.5 Hz, 2H), 5.67 (br s, NH), 5.20 (br s, NH), 4.40 (d, J=6.9 Hz, 2H), 4.19 (t, J=6.8 Hz, 1H), 3.73-3.62 (m, 2H), 3.52 (dd, J=12.7, 6.4 Hz, 2H), 3.30-3.15 (m, 4H), 1.76 (p, J=6.3 Hz, 2H), 1.44 (s, 9H); $^{13}$C NMR (101 MHz, CDCl$_3$) δ 169.01, 162.47, 161.67, 156.51, 150.81, 148.50, 143.98, 141.42, 127.81, 127.13, 125.15, 123.63, 120.10, 116.59, 79.26, 66.77, 47.37, 40.19, 37.48, 36.33, 33.27, 30.38, 28.57; MS (ESI) m/z 633.87 (M+H)$^+$.

tert-Butyl (3-(2'-(2-Aminoethyl)-[2,4'-bithiazole]-4-carboxamido)propyl)carbamate (15). To a solution of compound 14 (210.0 mg, 0.331 mmol) in DMF (2.9 mL), piperidine (0.75 mL) was added. The reaction mixture was stirred at room temperature for 4 h and the solvent was removed under reduced pressure. Water was added and the mixture was extracted with CH$_2$Cl$_2$. The combined organic phases were washed with water and brine, dried over Na$_2$SO$_4$ and then concentrated under reduced pressure. The crude residue was purified by flash column chromatography using a mixture CH$_2$Cl$_2$/MeOH 85:15 as the eluent to provide pure compound 15 as a colorless solid: 121 mg (89%); R$_f$=0.27 (CH$_2$Cl$_2$/MeOH 91:09); $^1$H NMR (400 MHz, CD$_3$OD) δ 8.18 (s, 1H), 8.14 (s, 1H), 3.49 (t, J=6.8 Hz, 2H), 3.27-3.10 (m, 6H), 1.82 (p, J=6.5 Hz, 2H), 1.47 (s, 9H); $^{13}$C NMR (101 MHz, CD$_3$OD) δ 171.40, 163.92, 163.40, 158.49, 151.60, 149.42, 124.82, 118.19, 79.90, 42.24, 38.73, 37.79, 36.91, 30.94, 28.78; MS (ESI) m/z 411.87 (M+H)$^+$.

4-((2-(4-((3-((tert-Butoxycarbonyl)amino)propyl)carbamoyl)-[2,4'-bithiazol]-2'-yl)ethyl)amino)-4-oxobutanoic acid (16). To a solution of compound 15 (100.0 mg, 0.24 mmol) in DCM (1.0 mL), succinic anhydride (26.0 mg, 0.26 mmol, 1.08 eq) was added. The reaction mixture was stirred at room temperature for 2 h, then it was concentrated under reduced pressure. The crude residue was purified by flash column chromatography using a mixture CH$_2$Cl$_2$/MeOH 95:5 as the eluent to provide pure compound 16 as a colorless solid: 86.9 mg (91%); R$_f$=0.43 (CH$_2$Cl$_2$/MeOH 91:09); $^1$H NMR (400 MHz, CD$_3$OD) δ 8.10 (s, 1H), 8.06 (s, 1H), 3.57 (t, J=6.8 Hz, 2H), 3.41 (t, J=6.8 Hz, 2H), 3.20 (t, J=6.8 Hz, 2H), 3.10 (t, J=6.6 Hz, 2H), 2.57-2.51 (m, 2H), 2.46-2.41 (m, 2H), 1.73 (p, J=6.5 Hz, 2H), 1.38 (s, 9H); $^{13}$C NMR (101 MHz, CD$_3$OD) δ 176.09, 174.68, 170.65, 163.96, 163.47, 158.54, 151.56, 149.46, 124.86, 118.46, 79.96, 40.06, 38.73, 37.79, 33.67, 31.56, 30.92, 30.22, 28.76; MS (ESI) m/z 511.80 (M+H)$^+$.

4-((2-(4-((3-((tert-Butoxycarbonyl)(4-((tert-butoxycarbonyl)amino)butyl)amino)propyl)carbamoyl)-[2,4'-bithiazol]-2'-yl)ethyl)amino)-4-oxobutanoic-amido-Boc$_6$-neomycin (17a). To a solution of compound 13 (34.1 mg, 0.040 mmol) in anhydrous CH$_2$Cl$_2$ (1.0 mL), EDC (14.0 mg, 0.073 mmol, 1.8 eq), and HOSu (8.0 mg, 0.070 mmol, 1.7 eq) were added. The reaction mixture was stirred at room temperature for 30 min before adding Neo(Boc)$_6$-NH$_2$ compound (63.0 mg, 0.051, 1.3 eq). The reaction mixture was stirred at room temperature overnight, then water was added and the mixture was extracted with CH$_2$Cl$_2$. The combined organic phases were washed with water and brine, dried over Na$_2$SO$_4$ and then concentrated under reduced pressure. The crude residue was purified by flash column chromatography using a mixture CH$_2$Cl$_2$/MeOH 95:05 as the eluent to provide pure compound 17a as a colorless solid: 37.6 mg (50%); R$_f$=0.43 (CH$_2$Cl$_2$/MeOH 93:07); $^1$H NMR (400 MHz, CD$_3$OD) δ 8.19 (s, 1H), 8.18 (s, 1H), 5.41 (s, 1H), 5.10 (s, 1H), 4.87 (s, 1H), 4.29 (s, 1H), 4.06 (br s, 1H), 3.99-3.87 (s, 4H), 3.76 (s, 2H), 3.64 (t, J=6.7, 1H), 3.61-3.57 (m, 3H), 3.57-3.41 (m, 7H), 3.41-3.31 (m, 6H), 3.31-3.12 (m, 7H), 3.06 (t, J=6.7 Hz, 2H), 2.67-2.49 (m, 4H), 2.01-1.92 (s, 1H), 1.88 (br s, 2H), 1.58 (s, 2H), 1.53-1.34 (m, 75H); $^{13}$C NMR (101 MHz, CD$_3$OD) δ 173.50, 173.37, 169.36, 162.69, 162.06, 157.49, 157.14, 157.06, 156.82, 156.48, 150.29, 148.13, 123.52, 117.24, 110.53, 99.31, 97.79, 86.71, 79.81, 79.61, 79.38, 79.28, 79.06, 78.93, 78.91, 78.82, 78.42, 74.64, 74.18, 73.11, 71.96, 71.43, 71.34, 70.30, 67.68, 55.56, 52.20, 51.0, 50.08, 46.47, 44.51, 42.22, 41.22, 40.60, 39.59, 38.80, 36.49, 34.41, 32.34, 31.29, 31.02, 27.63, 27.52, 27.46, 27.42, 27.37, 26.94; HRMS (ESI), m/z 1879.9263 (M+H)$^+$ ($C_{83}H_{141}N_{13}O_{31}S_2$ requires 1879.9292).

4-((2-(4-((3-((tert-Butoxycarbonyl)amino)propyl)carbamoyl)-[2,4'-bithiazol]-2'-yl)ethyl)amino)-4-oxobutanoicamido-Boc$_6$-neomycin (17b). To a solution of compound 16 (33.0 mg, 0.065 mmol, 1.8 eq) in anhydrous $CH_2Cl_2$ (400 μL), EDC (21.0 mg, 0.109 mmol, 3.1 eq), and HOSu (12.5 mg, 0.109 mmol, 3.1 eq) were added. The reaction mixture was stirred at room temperature for 6 h before adding Neo(Boc)$_6$-NH$_2$ compound (42.5 mg, 0.035 mmol). The reaction mixture was stirred overnight at room temperature. Water was added and the mixture was extracted with $CH_2Cl_2$. The combined organic phases were washed with water and brine, dried over $Na_2SO_4$ and then concentrated under reduced pressure. The crude residue was purified by flash chromatography using a mixture $CH_2Cl_2$/MeOH 95:5 as the eluent to provide pure compound 17b as a colorless solid: yield 23.2 mg (39%); $R_f$=0.34 ($CH_2Cl_2$/MeOH 95:05); $^1$H NMR (400 MHz, CD$_3$OD) δ 8.19 (s, 2H), 5.41 (s, 1H), 5.07 (s, 1H), 4.87 (s, 1H), 4.29 (br s, 1H), 4.13-4.01 (m, 1H), 4.00-3.86 (m, 4H), 3.76 (br s, 2H), 3.70-3.42 (m, 10H), 3.42-3.10 (m, 12H), 2.67-2.47 (m, 4H), 2.02-1.90 (m, 1H), 1.80 (p, J=6.4, 2H), 1.55-1.31 (m, 64H); $^{13}$C NMR (101 MHz, CD$_3$OD) δ 174.89, 174.76, 170.76, 164.10, 163.58, 158.89, 158.59, 158.53, 158.46, 158.21, 157.86, 151.64, 149.51, 124.94, 118.69, 111.88, 100.74, 99.15, 88.08, 81.22, 80.79, 80.68, 80.46, 80.30, 80.21, 80.00, 76.03, 75.58, 74.49, 73.37, 72.81, 72.73, 71.69, 69.07, 56.95, 53.59, 52.47, 51.46, 43.62, 42.70, 42.02, 40.19, 38.77, 37.83, 35.78, 33.73, 32.69, 32.43, 30.98, 29.01, 28.91, 28.87, 28.84, 28.79, 28.76; HRMS (ESI), m/z 1707.7983 (M+H)$^+$ ($C_{74}H_{123}N_{12}O_{29}S_2$ requires 1707.7955).

4-((2-(4-((3-((4-aminobutyl)amino)propyl)carbamoyl)-[2,4'-bithiazol]-2'-yl)ethyl)amino)-4-oxobutanoic-amido-neomycin (18a). Compound 17a (30.0 mg, 0.016 mmol) was deprotected following general procedure B and leading to pure compound 18a as colorless solid: yield 14.8 mg (86%). Retention time 3.6 min; $^1$H NMR (400 MHz, D$_2$O) δ 8.24 (s, 1H), 8.12 (s, 1H), 5.97 (d, J=3.9 Hz, 1H), 5.41 (d, J=3.9 Hz, 1H), 5.29 (d, J=1.4 Hz, 1H), 4.37 (t, J=5.1 Hz, 1H), 4.34-4.22 (m, 4H), 4.13 (t, J=9.6 Hz, 1H), 4.06-3.91 (m, 3H), 3.84 (br s, 1H), 3.79-3.70 (m, 1H), 3.67-3.58 (m, 4H), 3.58-3.31 (m, 10H), 3.29 (t, J=6.5, 2H), 3.19-3.07 (m, 4H), 3.04 (t, J=6.9 Hz, 2H), 2.55 (s, 5H), 2.10-2.00 (m, 2H), 1.92 (q, J=12.6 Hz, 1H), 1.85-1.70 (m, 4H); $^{13}$C NMR (101 MHz, D$_2$O) δ 175.40, 174.70, 170.87, 163.67, 163.44, 163.09, 162.98, 162.73, 162.38, 148.79, 146.96, 125.02, 120.68, 118.86, 117.78, 114.88, 111.98, 109.41, 95.77, 94.91, 84.91, 80.56, 77.34, 75.21, 73.35, 72.28, 70.34, 70.11, 69.84, 68.08, 67.57, 67.40, 53.16, 50.79, 49.55, 48.47, 46.92, 45.13, 41.35, 40.45, 39.96, 39.01, 38.74, 36.22, 32.06, 30.78, 30.58, 25.74, 23.87, 22.73; HRMS (ESI), m/z 1078.5023 (M+H)$^+$ ($C_{43}H_{76}N_{13}O_{15}S_2$ requires 1078.5020).

4-((2-(4-((3-aminopropyl)carbamoyl)-[2,4'-bithiazol]-2'-yl)ethyl)amino)-4-oxobutanoic-amido-neomycin (18b). Compound 17b (22.0 mg, 0.013 mmol) was deprotected following general procedure B and leading to pure compound 18b as a colorless solid: 13.1 mg (100%); Retention time 2.4 min; $^1$H NMR (400 MHz, D$_2$O) δ 8.23 (s, 1H), 8.11 (s, 1H), 5.96 (d, J=3.9 Hz, 1H), 5.40 (d, J=3.8 Hz, 1H), 5.29 (br s, 1H), 4.36 (t, J=5.1 Hz, 1H), 4.31 (t, J=4.8 Hz, 1H), 4.30-4.26 (m, 1H), 4.26-4.22 (m, 2H), 4.12 (t, J=9.6 Hz, 1H), 4.06-3.91 (m, 3H), 3.83 (s, 1H), 3.74 (t, J=9.7 Hz, 1H), 3.66-3.48 (m, 9H), 3.48-3.30 (m, 6H), 3.28 (t, J=6.4 Hz, 2H), 3.10 (t, J=7.6 Hz, 2H), 2.59-2.47 (m, 5H), 2.07-1.98 (m, 2H), 1.92 (q, J=12.7 Hz, 1H); $^{13}$C NMR (101 MHz, D$_2$O) δ 175.39, 174.68, 170.86, 163.60, 163.44, 163.09, 162.93, 162.74, 162.39, 148.83, 146.96, 124.95, 120.67, 118.87, 117.77, 114.87, 111.97, 109.40, 95.78, 94.91, 84.90, 80.56, 77.34, 75.21, 73.35, 72.28, 70.33, 70.11, 69.84, 68.08, 67.56, 67.39, 53.15, 50.79, 49.55, 48.46, 41.34, 40.44, 39.96, 39.00, 37.05, 36.22, 32.06, 30.78, 30.57, 27.88, 26.80; HRMS (ESI), m/z 1007.4287 (M+H)$^+$ ($C_{39}H_{67}N_{12}O_{15}S_2$ requires 1007.4285).

Example 2: Biological Activity of Compounds of the Invention

A—Materials

Nestin (MAB5326) and H3Pser10 (AB-5176) antibodies were purchased respectively to Millipore (Millipore S.A.S., 39 Route Industrielle de la Hardt Molsheim Alsace 67120, France) and Abcam (24 rue Louis Blanc, 75010 PARIS, FRANCE). The cell proliferation kit XTT assay (ref: 11465015001) was purchased to Roche diagnostic (2, Avenue du Vercors, BP 59, 38242 Meylan Cedex, France). HepaRG, HEK293, culture medium and supplement were purchased to Thermo Fisher scientific. TMZ were provided by Dr. Chneiweiss.

B—Cell culture: Patient-derived cells GB5 were isolated from surgical resection of human primary GBM provided by the department of neurosurgery of the University Hospital of Nice. TG6 (patient-derived cell from primary GBM) and HNNSC25 (Human Normal Neural Stem Cells) have been provided by Dr Hervé Chneiweiss, University of Pierre and Marie Curie, Paris. The resulting primary cultures (GB5, TG6, HNNSC25) were grown in NS34+ medium containing EGF and bFGF (DMEM-F12 1/1 ratio, 10 mM glutamine, 10 mM Hepes, 0.025% Sodium bicarbonate, N2, G5, and B27).

HepaRG™ are terminally differentiated hepatic cells derived from a human hepatic progenitor cell that retains many characteristics of primary human hepatocytes. HepaRG were grown in William's E Medium supplemented with Tox medium supplement and glutamax.

HEK293 (human embryonic kidney cell) were grown in DMEM supplemented with glutamax and 10% foetal calf serum.

C—Methods:

Clonal proliferation: TG6 and GB5 were seeded at 10 cells/well in 96 wells plate in NS34+ medium alone or containing growing concentration of Compounds 9a-b and 18a-b. Immediately after seeding, the real number of cells in the well was determined by direct count. Two and three weeks later, the resulting number of spheroids in each well was evaluated by a direct count. The % of clonal efficiency was calculated in dividing the number of the cells seeded in the well by the number of resulting spheroids.

II—XTT assay: TG6 and GB5 were seeded at 2000 cells/well in 96 wells plate in NS34+ alone or containing 10, 20, 25, 50 and 100 uM of Compounds 9a-b and 18a-b. Cultures were incubated 4 days and the cell proliferation was evaluated as indicated by the manufacturer.

III—Immunofluorescence assay: TG6 and GB5 were seeded at 2000 cells/well in 24 wells plate in NS34+ alone or containing 5, 7.5, 10, 12.5, 15, 20 and 25 uM of Compounds 9a-b and 18a-b. Cultures were incubated 4 days and the cells were fixed with 4% paraformaldehyde for 10 min at room temperature then washed with PBS. Cells were then incubated with ammonium chloride at 20 mM 5 min at room temperature and washed 5 times with PBS. Blocking and hybridization were realized in PBS containing 10% FCS and 0.1% Triton X100. Anti-Nestin and anti-H3Phospho serine 10 antibodies were incubated 2 hours at room temperature then washed with PBS. Fluorescence coupled secondary antibodies and Hoechst 33342 nuclei counterstaining reagent were hybridized one hour at room temperature. Cells were mounted with anti-fading agent then imaged, counted and quantified using fluorescent microscopy (TiE Nikon) and NiS software (Nikon).

IV—TMZ assay: TG6 and GB5 were seeded at 2000 cells/well in 96 wells plate in NS34+ or treated with medium containing 400 uM of TMZ alone or mixed with 10, 25 and 50 uM of Compounds 9a-b and 18a-b. Cultures were incubated 4 days and the cell viability has been evaluated by XTT assays and a count of living and dead cells with trypan blue staining.

V—Toxicity tests: NNSC, GB5, TG6, HEK293, and HepaRG, HUVEC were seeded at 2000 cells/well in 96 wells plate in their respective culture mediums alone or containing growing concentration from 10 to 500 uM of Compounds 9a-b. Cultures were incubated 4 days and the cellular toxicity has been evaluated by XTT assays. Cell viability has been also assessed by counting living and dead cells with trypan blue staining.

Results

Patient-derived glioma stem cells (GSC or GiCs) differentiation is accompanied by deep changes in their behaviour and morphology. Indeed, while growing in 3D in defined medium, they become adherent and adopt a morphology typical of differentiated cells usually exemplified by a weak nuclear/cytoplasmic ratio and cytosolic extension. Along with these phenotypic changes, stemness markers, such as NESTIN, NANOG, OCT4, SOX2 are down-regulated, and GSC tumorigenicity as well as their efficiency for clonal expansion are inhibited.

1) Effects of Compound Treatment on GSC Phenotype

Patient derived GSC (GB5) were treated with growing concentration of Compounds 9a-b and 18a-b (10 to 100 uM) during three days). Compounds 9a-b and 18a at 10 uM, and Compound 18b at 25 uM induced adhesion and changes in GSC morphology, which is reminiscent to differentiated GBM cells in culture (FIG. 1). Similar results have been obtained with TG6.

2) Effects of Compound Treatment on Stemness Properties and Tumorigenicity:

Patient derived GSC (GB5) have been treated during seven days, with growing concentrations of compounds that have been capable of inducing changes of GSC morphology. To assess the consequence on stemness maintenance, we observed, by immunofluorescence, the expression of stemness and progenitor cells such as the NESTIN protein. As seen in table 1 and FIG. 2A, the results showed a drop in NESTIN expression when GSC have been treated with the Compounds 9a-b and 18a. The strongest effect has been obtained with Compounds 9a treatment (IC50=10 uM). Similar effects have been observed for OCT4, NANOG and SOX2 expression following Compounds 9a treatment (FIG. 2B).

Figure 2:
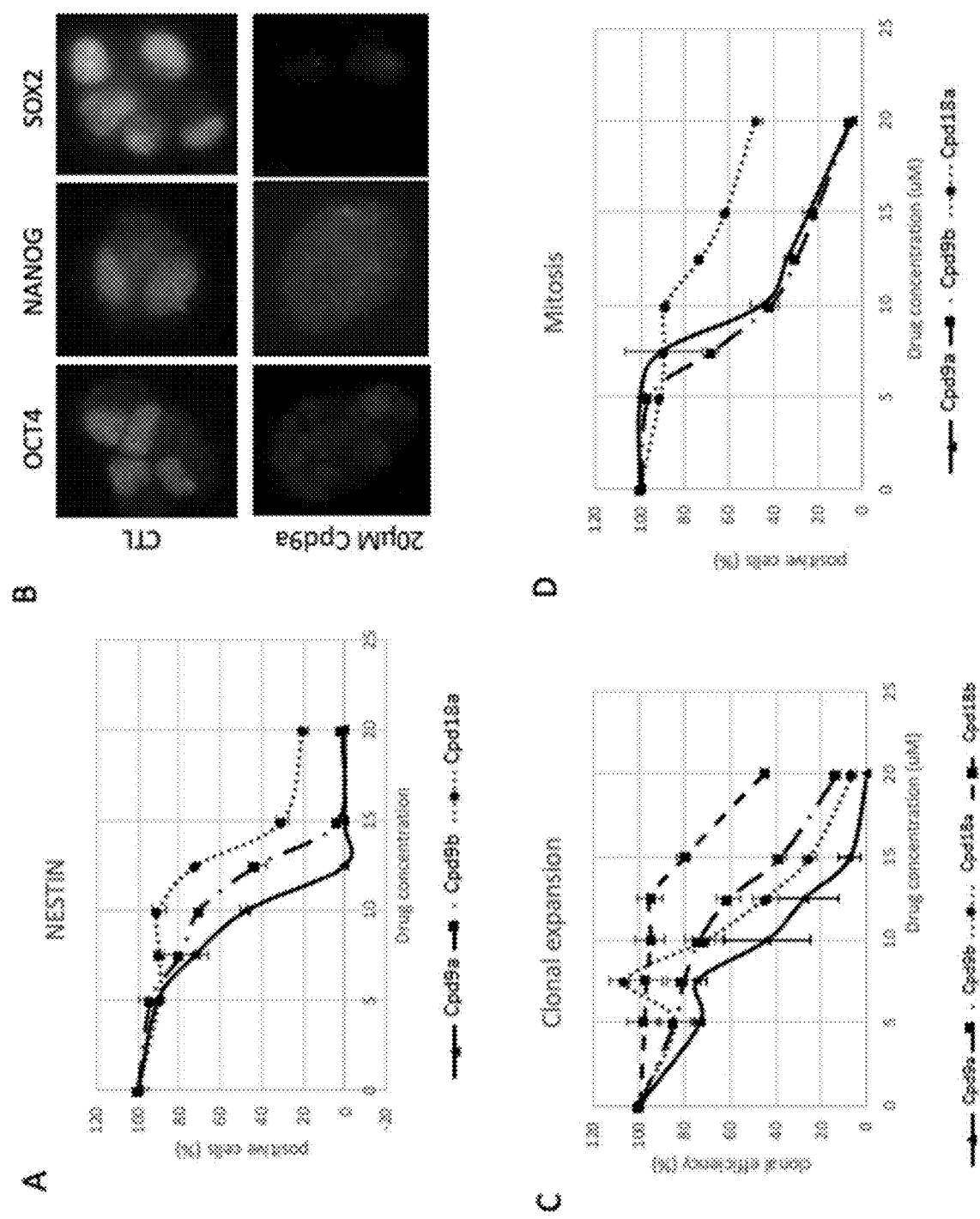
FIG. 2: Compounds 9a-b and 18a-b effect on stemness marker expression, clonal expansion and mitosis in GB5 cells. (A) NESTIN expression was assessed by immunofluorescence in GB5 treated with increasing amount of Compounds 9a-b and 18a. The number of NESTIN positive cells was counted for each treatment and express as percentage of the control (100%). The results are the meaning of at least two separate experiments. (B) immunofluorescence showing the down regulation of OCT4, NANOG, SOX2 pluripotency markers in GB5 treated with 20 uM Compound 9a as compared to their control counterparts. (C) Clonal expansion analysis was performed with GB5 cells as described in the material and method section. Two and three weeks later, the number of spheroids is counted and reported as percentage of the initial number of cells in the well. The results are the meaning of a minimum of two separate experiments. (D) The number of mitosis in the culture was determined by the detection of the number of cells positive for histone H3 phosphorylated on ser-10 (H3-ser10). H3-ser10 expression was assessed by immunofluorescence in GB5 treated with increasing amount of Compounds 9a-b and 18a. The number of positive cells was counted for each treatment and express as percentage of the control (100%). The results are the meaning of at least two separate experiments.

It was further investigated the effects of selected compounds on GSC clonal expansion as well as their capacity of mitosis (FIGS. 2B and C). Compounds 9a-b and 18a treatment altered GSC clonal expansion and mitosis. The most efficient inhibition of clonal expansion was provided by Compound 9a treatment (IC50<10 uM) while both Compounds 9a-b were the most efficient for mitosis inhibition (IC50<10 uM) (FIGS. 2C and D).

Figure 3:
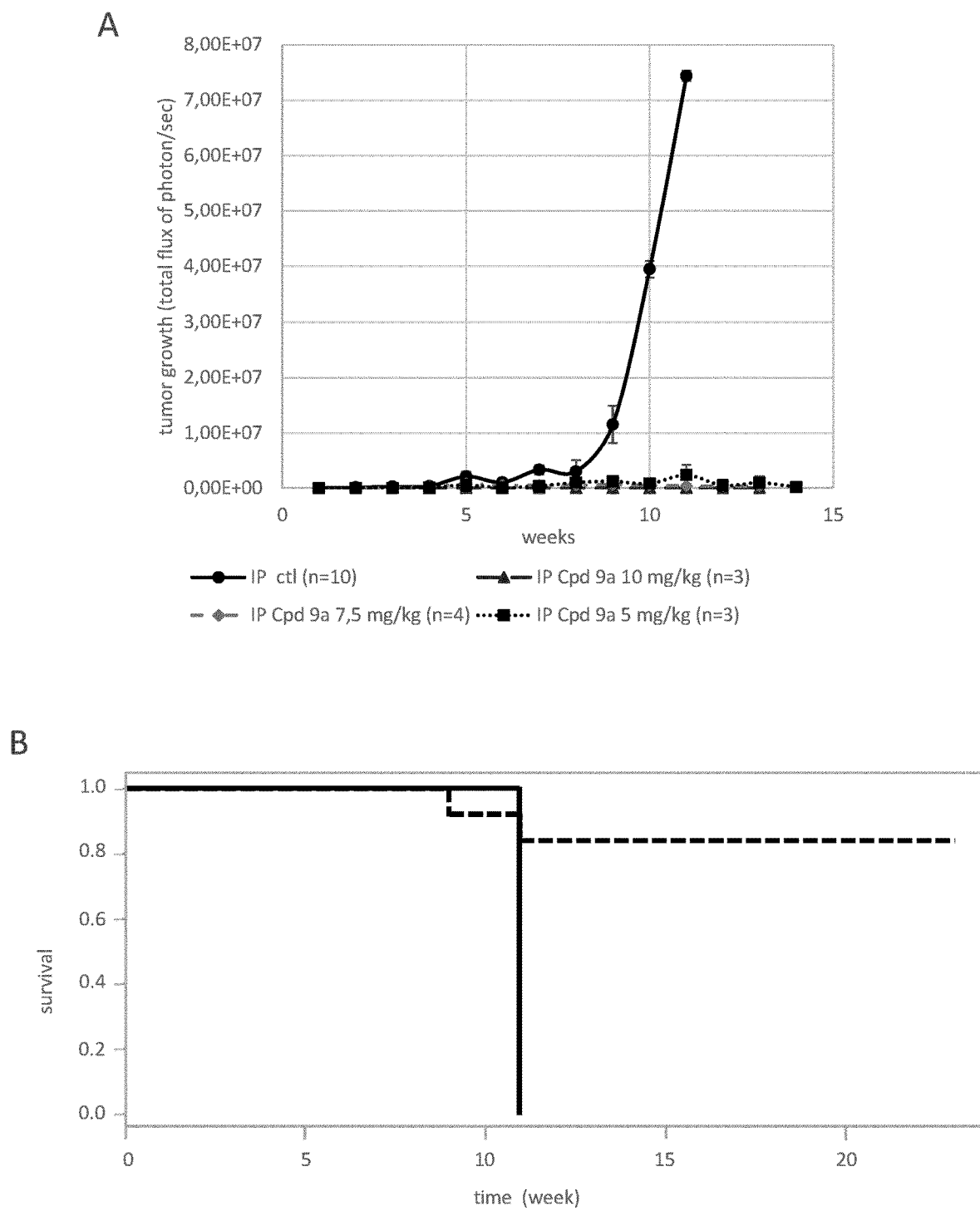
Figure 3:
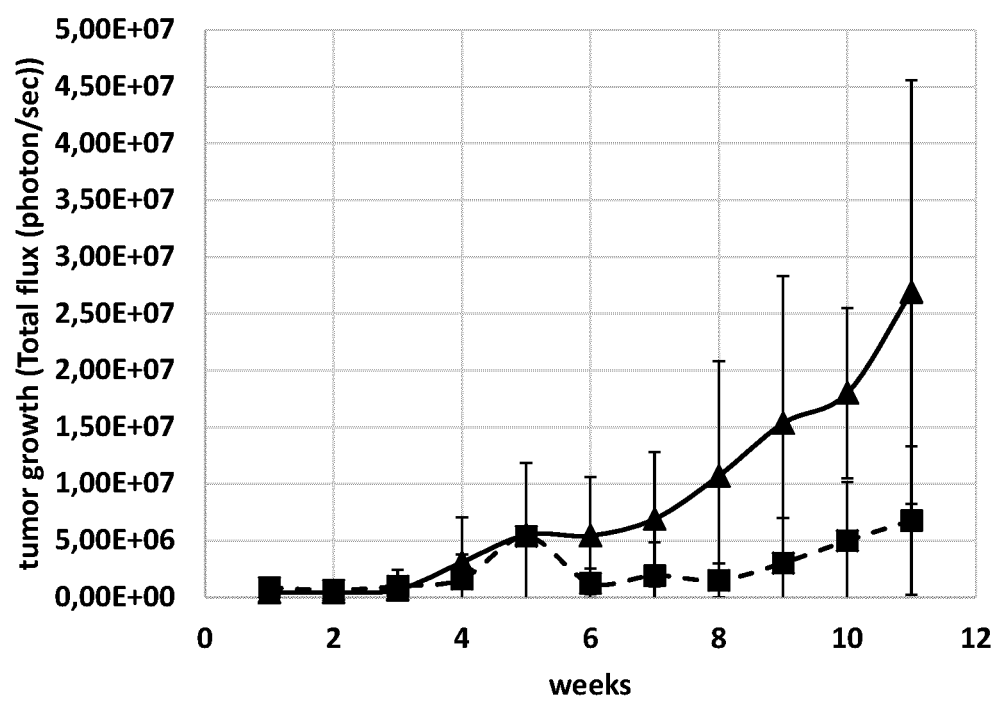

Nude mice were orthotopically xenografted by luminescent patient derived GSC. Two weeks following injections, mice were intraperitoneally injected with 10 mg/kg (n=4), 7.5 mg/kg (n=4) or 5 mg/kg (n=4) of Compound 9a or vehicle alone as control (ctl n=10) three days a week (Monday, Wednesday, Friday, with a pause during the weekend). Every week, each mouse had undergone live imaging (IVIS lumina III) to detect tumor initiation and progression. In the control group, all the control mice developed a tumor. In the Compound 9a treated mice only two mice above twelve (one respectively in the 10 mg/kg and 5 mg/kg treated groups) developed a tumor. FIG. 3A is a graphical representation of the average of tumor growth in the control group (n=10) and in each Compound 9a treated groups (note that the two mice that have developed a tumor in the treated groups have been excluded from the average). FIG. 3 B shows the survival of the whole population of mice of the untreated and treated groups that have been compared using a log rank test according to Kaplan Meier method. (R command, see World Wide Web: biostatgv.sentiweb.fr/?module-tests/surv). In this graphic the two mice of the treated group that have developed a tumor are represented. According to these results, it was thus observed from nude mice that have been orthotopically xenografted by luminescent patient derived GSC, that Compound 9a treatment, injected in intraperitoneal at 10 mg/kg, 7.5 mg/kg and 5 mg/kg, prevented tumor initiation and development (FIGS. 3 A and B).

To further determine whether Compound 9a might also alter tumor growth of tumors that were already formed before treatment, 50000 GSC expressing a luciferase gene (GB1-luc) for luminescent live imaging were injected in the brain of 12 nude mice. When the tumors reached an appropriate size comprised between $2 \cdot 10^6$ and $1 \cdot 10^7$ total flux of photon per second, the mice were treated either with DMSO (n=6) or by Compound 9a (n=6) at a dose of 7.5 mg/kg three times a week with a pause the weekend. Tumor growth were controlled every week by live imaging. The results, shown in FIG. 3C (control: -♦-; and Compound 9a: -■-), demonstrated that Compound 9a repressed tumor growth. The difference between the two groups at the $11^{th}$ week was significant, ***P value=0,017. Taken together these results indicate that Compound 9a not only repressed tumor initiation and development but also the growth of tumors already formed.

Figure 4:
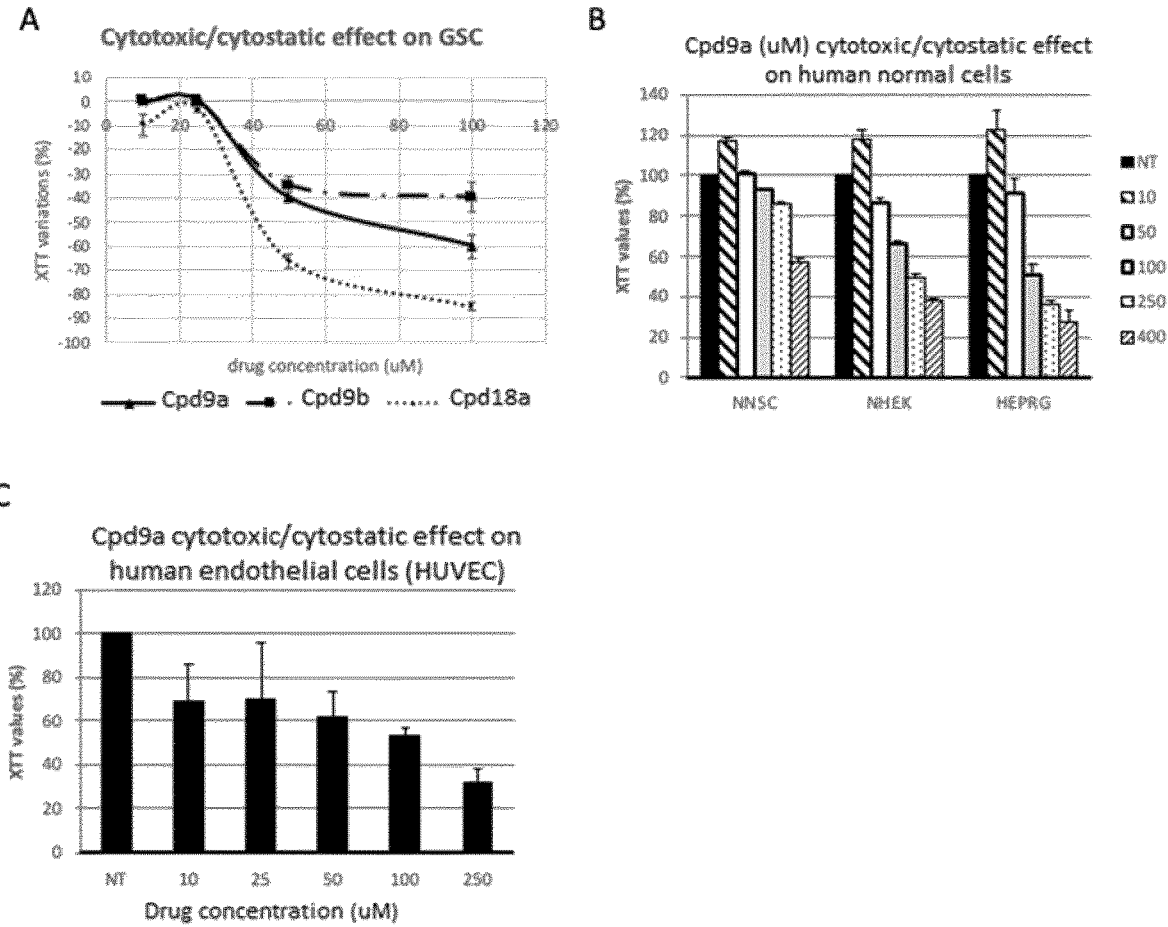
FIG. 4: Determination of compound toxicity on GSC and normal human cells. (A) GB5 were incubated with growing concentration of Compounds 9a-b and 18a. (B) human normal neural stem cell (NNSC), human normal kidney cells (NHEK), human normal hepatocytes (HEPRG) and (C) human endothelial cells (HUVEC) were treated with growing concentration of Compound 9a. 7 days later, the cells were subjected to an XTT assays as described in the method section. The results are the meaning of at least two separate experiments. Cell death was confirmed by trypan blue staining (not shown).

3) Effects of Compound Treatment on Cell Survival:

XTT assays allows, through cell metabolism measurement, to determine a cytotoxic/cytostatic effects. Compounds 9a-b and 18a were tested for their eventual toxicity by XTT assays as described in the material and method section. At the working concentrations 10 to 25 uM, the compounds are not toxic for GSC (FIG. 4A). However, Compounds 9a-b and 18a, displayed a relative toxicity at 50 uM and higher (FIG. 4A). These XTT results were confirmed by trypan blue staining, which directly reveals the percentage of dead cells. Compound 9a toxicity was further tested on normal neural stem cells (NNSC), human kidney (NHEK), human hepatocytes (HEPRG) and human endothelial cells (HUVEC). The compound is not toxic on NNSC, NHEK, HEPRG and HUVEC cells when used between 10 to 50 uM. At 100 uM and above, Compound 9a was toxic (FIG. 4).

Figure 5:
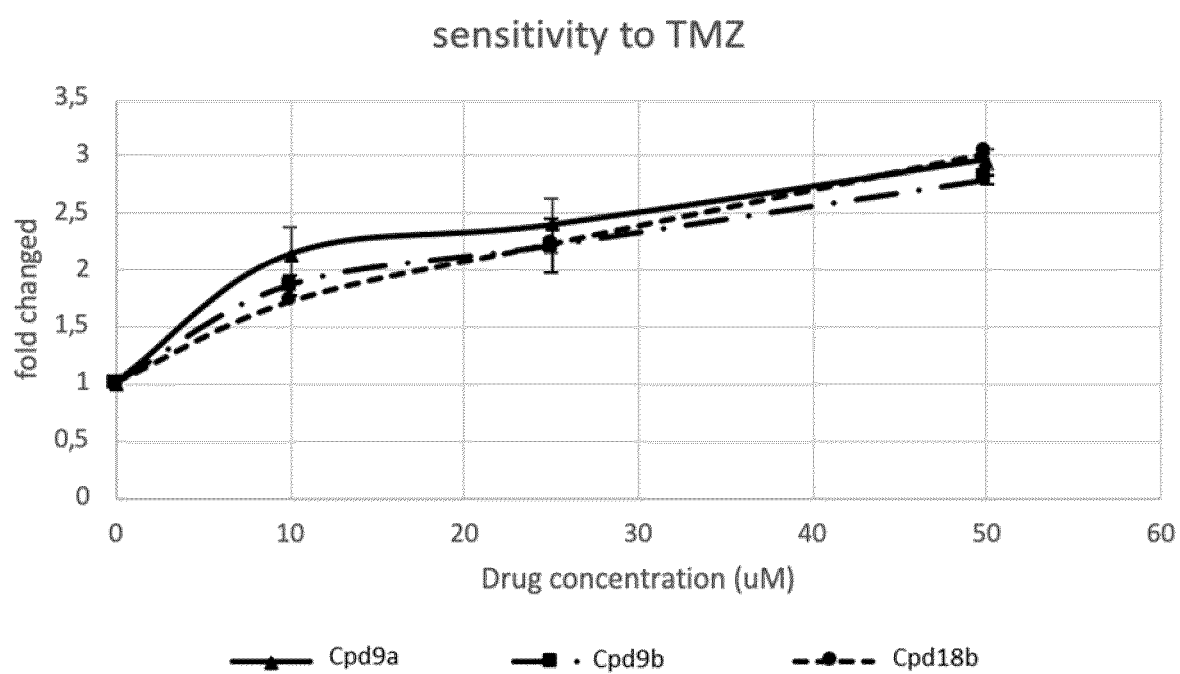
FIG. 5: Sensitivity to TMZ was assessed by comparing the percentage of dead cells between TMZ treated GB5 and TMZ treated GB5 in combination with Compound 9a. GB5 cells have been treated with 400 uM TMZ alone or in combination with growing concentrations of Compounds 9a-b and 18b. The results are the meaning of at least two separate experiments.

4) Effect of the Compounds 9a-b and 18b on GSC Sensitivity to Temozolomide (TMZ):

Temozolomide is the chemotherapy of reference for GBM treatment. In order to assess whether the compounds might sensitize GSC to TMZ, TMZ (400 uM) pretreated GB5 cells were incubated with 10, 25 and 50 uM of Compounds 9a-b and 18b. Three days later the experiment is stop and the cells were subjected to an XTT assays. At 10 uM, the results showed an increase of TMZ sensitivity of 2, 1.8 and 1.7 fold for Compounds 9a-b and 18b respectively (FIG. 5). A maximal effect of 2.9-, 2.8- and 3-fold, respectively for Compounds 9a-b and 18b, was observed at 50 uM. Cell toxicity was confirmed by trypan blue staining.

The invention claimed is:

1. A compound of general formula (I):

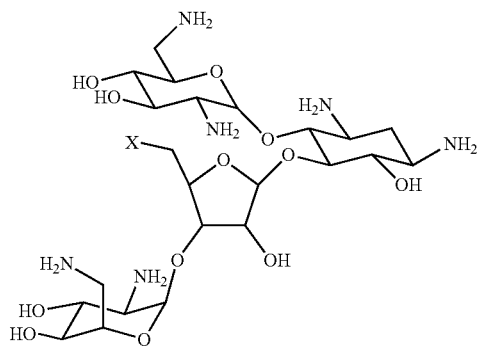

(I)

wherein X is selected in the group consisting of:

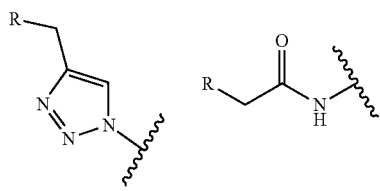

and wherein R is represented below:

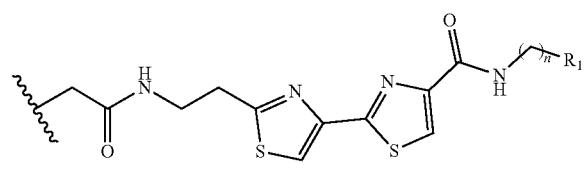

with n being an integer from 1 to 6;
and $R_1$ being a —$NHR_2$, —$NR_3R_4$, or a guanidyl group;
$R_2$ is a hydrogen atom, an amine protecting group, or an aminoalkyl group;
$R_3$ and $R_4$, identical or different, are independently a hydrogen atom, an amine protecting group, or an aminoalkyl group;
where any amine group being optionally protected by any amine protecting group;
or a salt, stereoisomer, a racemic mixture, geometric isomers, or a mixture thereof.

2. The compound according to claim 1, wherein X is

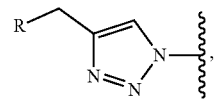

wherein R is represented below:

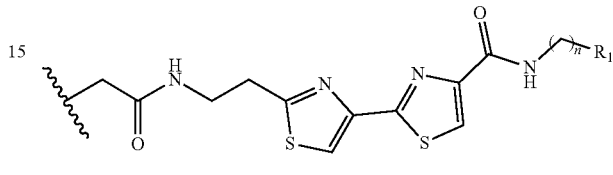

with n being an integer from 1 to 6 and $R_1$ is a guanidyl group, or $R_1$ is —$NR_3R_4$, with $R_3$ being an hydrogen atom or an amine protecting group, and $R_4$ being an aminoalkyl group.

3. The compound according to claim 1, wherein X is

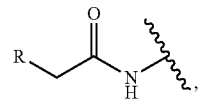

wherein R is represented below:

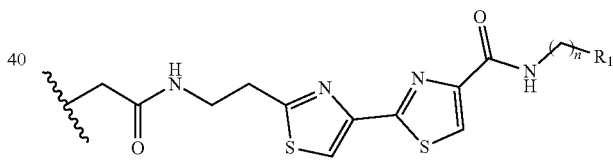

with n being an integer from 1 to 6 and $R_1$ is —$NH_2$, or $R_1$ is —$NR_3R_4$, with $R_3$ being an hydrogen atom or an amine protecting group, and $R_4$ being an aminoalkyl group.

4. The compound according to claim 1, wherein
$R_1$ is a —$NHR_2$, —$NR_3R_4$, or a guanidyl group;
$R_2$ is a hydrogen atom, an amine protecting group, or —$(CH_2)_mNH_2$; $R_3$ and $R_4$, identical or different, are independently a hydrogen atom, an amine protecting group, or —$(CH_2)_mNH_2$; where m is an integer from 1 to 6.

5. The compound according to claim 4, wherein m is 2, 3, 4, 5, or 6.

6. The compound according to claim 1, wherein at least one, or all, of the following definitions are met:
n is 3 or 4;
$R_1$ is selected from the group consisting of —$NH_2$, a guanidyl group, and —$NH(CH_2)_mNH_2$, where m is an integer from 1 to 6.

7. The compound according to claim 1, wherein R is one of the following formulas:
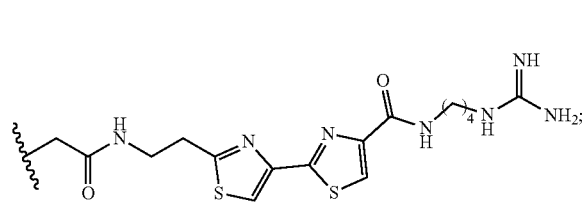
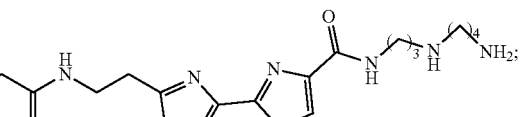
8. The compound according to claim 1, wherein said compound is selected from the group consisting of:
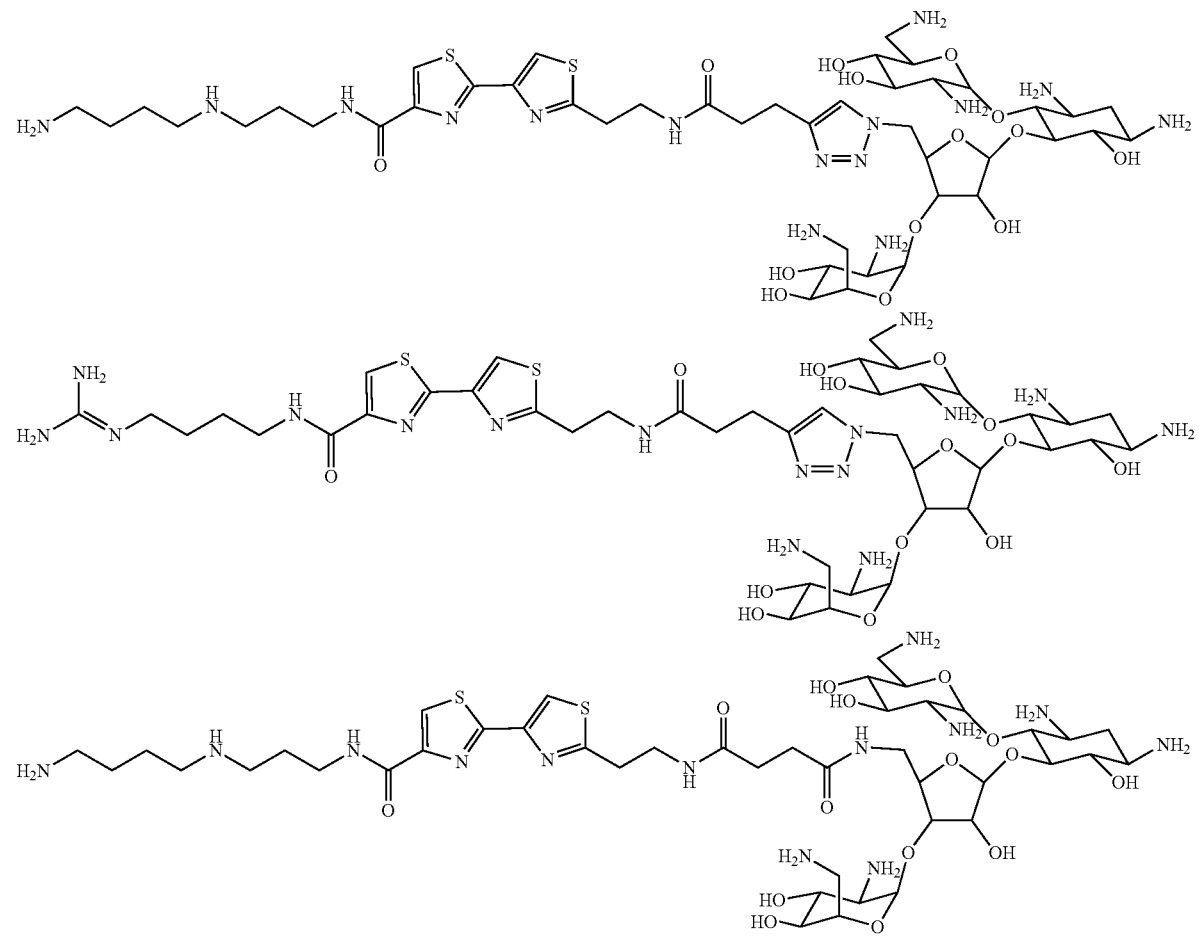
and
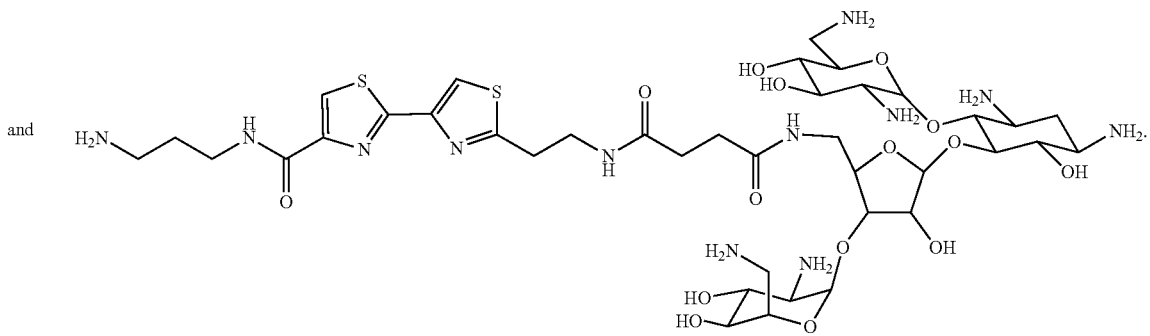

9. The compound according to claim 1, wherein the compound is:

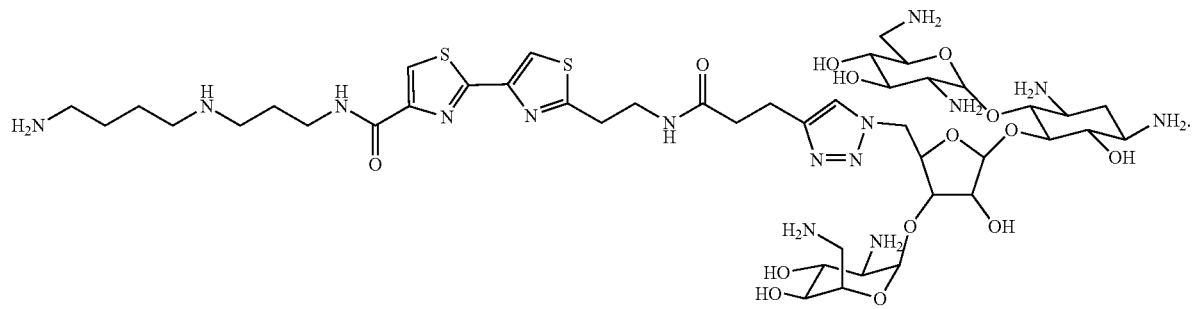 [SMILES: NCCCCNCCCNC(=O)c1csc(-c2csc(CCNC(=O)CCc3cn(CC4OC(OC5C(O)C(N)CC(N)C5OC5OC(CN)C(O)C(O)C5N)C(O)C4OC4OC(CN)C(O)C(O)C4N)nn3)n2)n1]

10. A pharmaceutical composition comprising a compound according to claim 1 and a pharmaceutically acceptable carrier and/or excipient.

11. A method of treating a glioma, glioblastoma or epithelial tumor cancer with cancer stem cells, comprising administration of a compound according to claim 1 to a subject in need thereof.

12. The method according to claim 11, wherein the subject in need thereof has a glioma or a glioblastoma.

13. The method according to claim 11, wherein said compound is administered in combination with a chemotherapeutic agent or radiotherapy.

14. The method according to claim 13, wherein said subject has a glioblastoma and said compound is administered in combination with a chemotherapeutic agent.

15. The method according to claim 14, wherein the chemotherapeutic agent is temozolomide.

* * * * *